(12) United States Patent
Nagatsu

(10) Patent No.: US 11,476,027 B2
(45) Date of Patent: Oct. 18, 2022

(54) ROTATION OPERATION DEVICE USING MAGNETIC FORCE AND ELECTRONIC APPARATUS USING THIS

(71) Applicant: CANON KABUSHIKI KAISHA, Tokyo (JP)

(72) Inventor: Sho Nagatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 324 days.

(21) Appl. No.: 16/687,776

(22) Filed: Nov. 19, 2019

(65) Prior Publication Data

US 2020/0168378 A1 May 28, 2020

(30) Foreign Application Priority Data

Nov. 22, 2018 (JP) .............................. JP2018-219471

(51) Int. Cl.
*H01F 7/02* (2006.01)
*H01F 7/17* (2006.01)
*H01F 7/14* (2006.01)

(52) U.S. Cl.
CPC ............. *H01F 7/0294* (2013.01); *H01F 7/02* (2013.01); *H01F 7/17* (2013.01); *H01F 7/145* (2013.01)

(58) Field of Classification Search
CPC ... H01F 7/02; H01F 7/17; H01F 7/145; H01F 7/0242; H01F 7/0294; G01D 2205/85; G01D 5/2451; G01P 3/487; G01P 13/045
See application file for complete search history.

(56) References Cited

U.S. PATENT DOCUMENTS

| 4,835,505 A | * | 5/1989 | Hattori | ...................... G01P 1/00 |
| | | | | 335/302 |
| 6,538,426 B1 | * | 3/2003 | Enrietto | ................ F16C 41/007 |
| | | | | 374/E13.01 |
| 2019/0072412 A1 | * | 3/2019 | Fuchigami | ............. H01H 19/11 |

FOREIGN PATENT DOCUMENTS

| JP | 2007257996 A | * | 10/2007 | |
| JP | 2007257996 A | | 10/2007 | |
| JP | 2012187202 A | * | 10/2012 | .......... A61M 5/1452 |
| JP | 2012187202 A | | 10/2012 | |
| JP | 2016219165 A | | 12/2016 | |

* cited by examiner

*Primary Examiner* — Mohamad A Musleh
(74) *Attorney, Agent, or Firm* — Rossi, Kimms & McDowell LLP

(57) ABSTRACT

A rotation operation device using magnetic force, which is compact and enables a user to perform a proper operation. The rotation operation device includes a rotation operation member rotatable about a predetermined axis. A ring-shaped magnet is magnetized in a magnetization direction parallel to the predetermined axis such that magnetic poles alternate. The magnet rotates about the predetermined axis along with rotation of the rotation operation member. A first magnetic body have first tooth portions formed at predetermined intervals along a circumferential direction and extending in radial directions of the magnet. The magnet overlaps with the first tooth portions in a direction of the predetermined axis. An operating physical force is generated according to changes in positions of the magnetic poles and the first tooth portions, which are caused by rotation of the magnet.

15 Claims, 23 Drawing Sheets

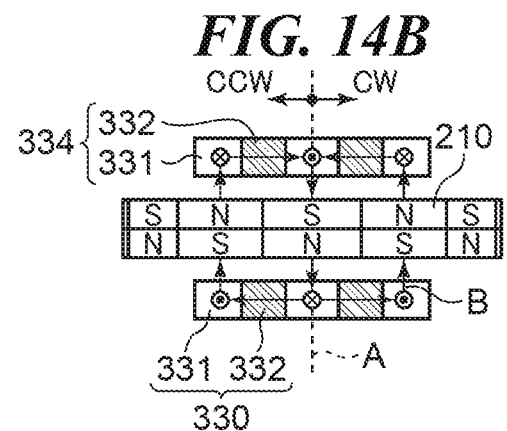
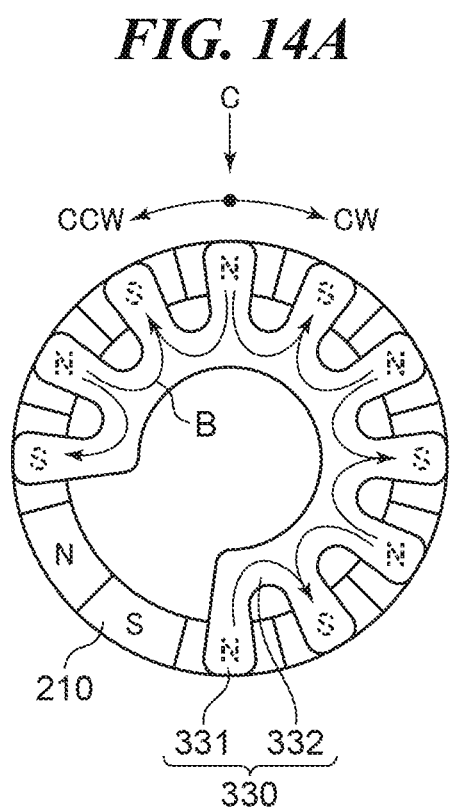
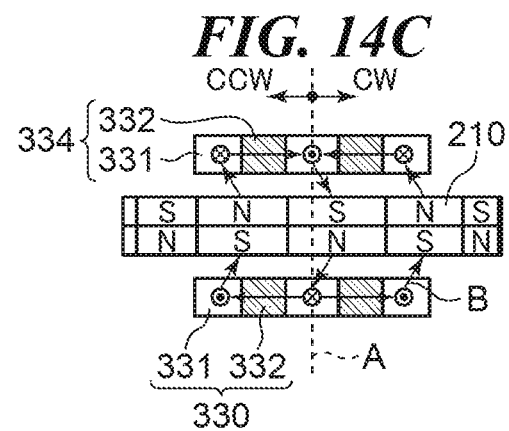
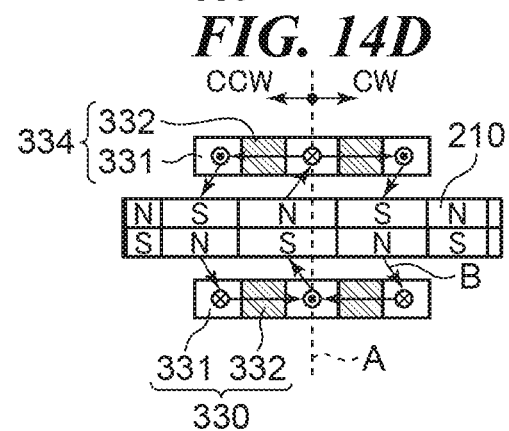
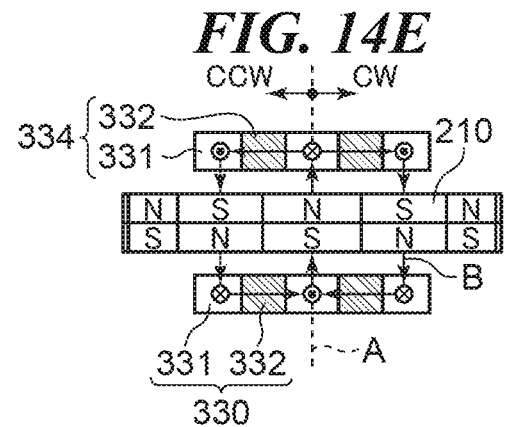

ROTATION OPERATION DEVICE USING MAGNETIC FORCE AND ELECTRONIC APPARATUS USING THIS

BACKGROUND OF THE INVENTION

Field of the Invention

The present invention relates to a rotation operation device and an electronic apparatus using this, and more particularly to an electronic apparatus equipped with a rotation operation device that generates an operating physical force using magnetic force.

Description of the Related Art

In general, an image capture apparatus as one of electronic apparatuses, such as a digital camera, is equipped with a rotation operation member, such as a dial. By operating the rotation operation member, setting of image capture conditions and selection of various functions are performed, for example. Conventionally, as the rotation operation member, there has been known one configured to generate an operating physical force using magnetic force.

For example, there has been known a dial constructed such that a disc-shaped permanent magnet having S poles and N poles alternately magnetized along its circumference and a magnetic body including a plurality of protruding portions radially formed are superposed in the axial direction and generates an operating physical force when operated for rotation (see e.g. Japanese Laid-Open Patent Publication (Kokai) No. 2012-187202).

Further, there has been known a dial configured to generate an operating physical force using a permanent magnet group having S poles and N poles alternately arranged in a direction of rotating an operation section and a magnetic body having a plurality of teeth opposed to the circumferential surface of the permanent magnet group (see e.g. Japanese Laid-Open Patent Publication (Kokai) No. 2007-257996).

However, in the dial described in Japanese Laid-Open Patent Publication (Kokai) No. 2012-187202, part of the magnetic body, which connects the protruding portions, also overlaps with the permanent magnet and hence a magnetic flux flowing from one protruding portion toward another is affected. As a result, the magnetic force on the protruding portions is reduced, which impairs the operating physical force.

Further, in the dial described in Japanese Laid-Open Patent Publication (Kokai) No. 2012-187202, the magnetic body having the plurality of protruding portions radially formed is not rotationally symmetrical, and hence the rotation operation member is sometimes tilted due to attraction between the permanent magnet and the magnetic body, which sometimes prevents the dial from being properly operated.

Further, in the dial described in Japanese Laid-Open Patent Publication (Kokai) No. 2007-257996, since the permanent magnet group and the magnetic body are opposed to each other via the circumferential surfaces thereof, the rotation operation member itself is increased in size in the radial direction.

SUMMARY OF THE INVENTION

The present invention provides a rotation operation device using magnetic force, which is compact and enables a user to perform a proper operation, and an electronic apparatus using this.

In a first aspect of the present invention, there is provided a rotation operation device including a rotation operation member capable of rotating about a predetermined axis, comprising a magnet that is ring-shaped and is magnetized in a magnetization direction parallel to the predetermined axis such that a plurality of magnetic poles alternate, the magnet being configured to rotate about the predetermined axis along with rotation of the rotation operation member, and a first magnetic body having first tooth portions formed at predetermined intervals along a circumferential direction such that the first tooth portions extend in radial directions of the magnet, wherein the magnet overlaps with the first tooth portions in a direction of the predetermined axis, and wherein an operating physical force is generated according to changes in positions of the magnetic poles and the first tooth portions, which are caused by rotation of the magnet.

In a second aspect of the present invention, there is provided an electronic apparatus comprising the rotation operation device further comprising a rotation detection section configured to detect rotation of the magnet, and a control unit configured to perform processing determined in advance according to rotation of the magnet, which is detected by the rotation detection section.

According to the present invention, it is possible to provide the rotation operation device which is compact and moreover enables a user to perform a proper operation.

Further features of the present invention will become apparent from the following description of exemplary embodiments (with reference to the attached drawings).

BRIEF DESCRIPTION OF THE DRAWINGS

FIGS. 14A to 14E are diagrams useful in explaining an operating physical force generated by the magnetic field of a magnet and yokes appearing in FIGS. 13A and 13B.

DESCRIPTION OF THE EMBODIMENTS

The present invention will now be described in detail below with reference to the accompanying drawings showing embodiments thereof.

An example of an electronic apparatus according to embodiments of the present invention will be described below with reference to accompanying drawings. Note that the following description is given of an image capture apparatus taken as an example of the electronic apparatus.

Figure 1A:
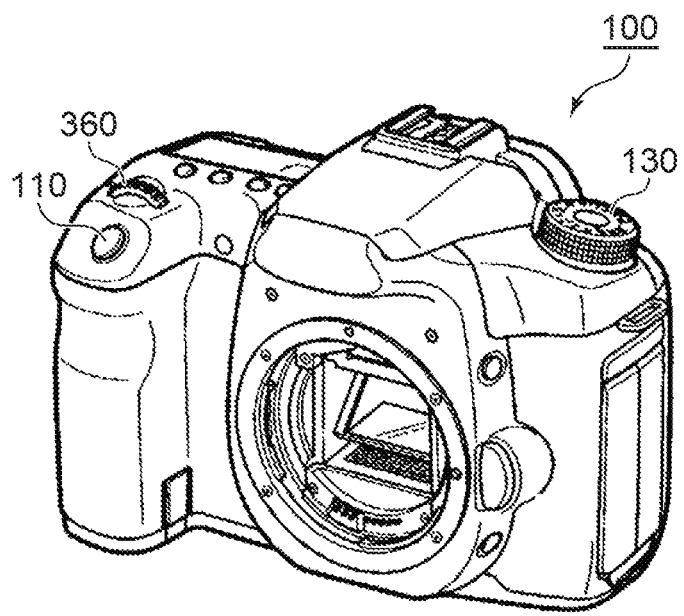
FIGS. 1A and 1B are perspective views of a digital camera as an electronic apparatus according to a first embodiment of the present invention.
Figure 1B:
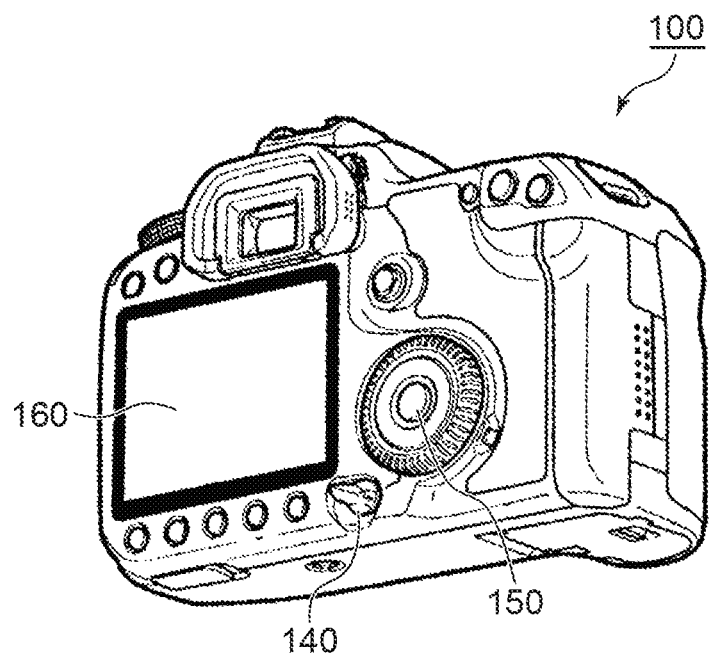

FIGS. 1A and 1B are perspective views of the electronic apparatus which is the electronic apparatus according to a first embodiment of the present invention. FIG. 1A is a perspective view, as viewed from the front, and FIG. 1B is a perspective view, as viewed from the rear. Note that in the illustrated example, the electronic apparatus is in a state in which a photographic lens unit has been removed.

The illustrated electronic apparatus is e.g. a digital camera (camera), and on an upper surface of the camera denoted by reference numeral 100, there are arranged a shutter button 110, a dial (a dial portion 360 thereof appears in FIG. 1A) and a mode switching switch 130. The shutter button 110 is an operation section for giving a photographing instruction, and the mode switching switch 130 is an operation section for switching between various photographing modes, and so forth.

The dial has the dial portion 360, and the dial portion 360 is partially exposed from the upper surface of the camera 100. The dial portion 360 is a rotation operation member which can be rotated in a clockwise direction and a counterclockwise direction, and various settings, such as a shutter speed and an aperture value, can be changed by rotating the dial portion 360, as described hereinafter.

The camera 100 has a power switch 140 provided on a rear surface thereof. The power switch 140 is used when the power supply of the camera 100 is turned on or off. Further, the camera 100 has a display device (display section) 160 and a set (SET) button 150 provided on the rear surface thereof. A TFT or an organic EL is used for the display device 160, and various setting screens and images obtained through photographing are displayed thereon. The SET button 150 is a push button and is mainly used when determining a selection item, for example.

Figure 2:
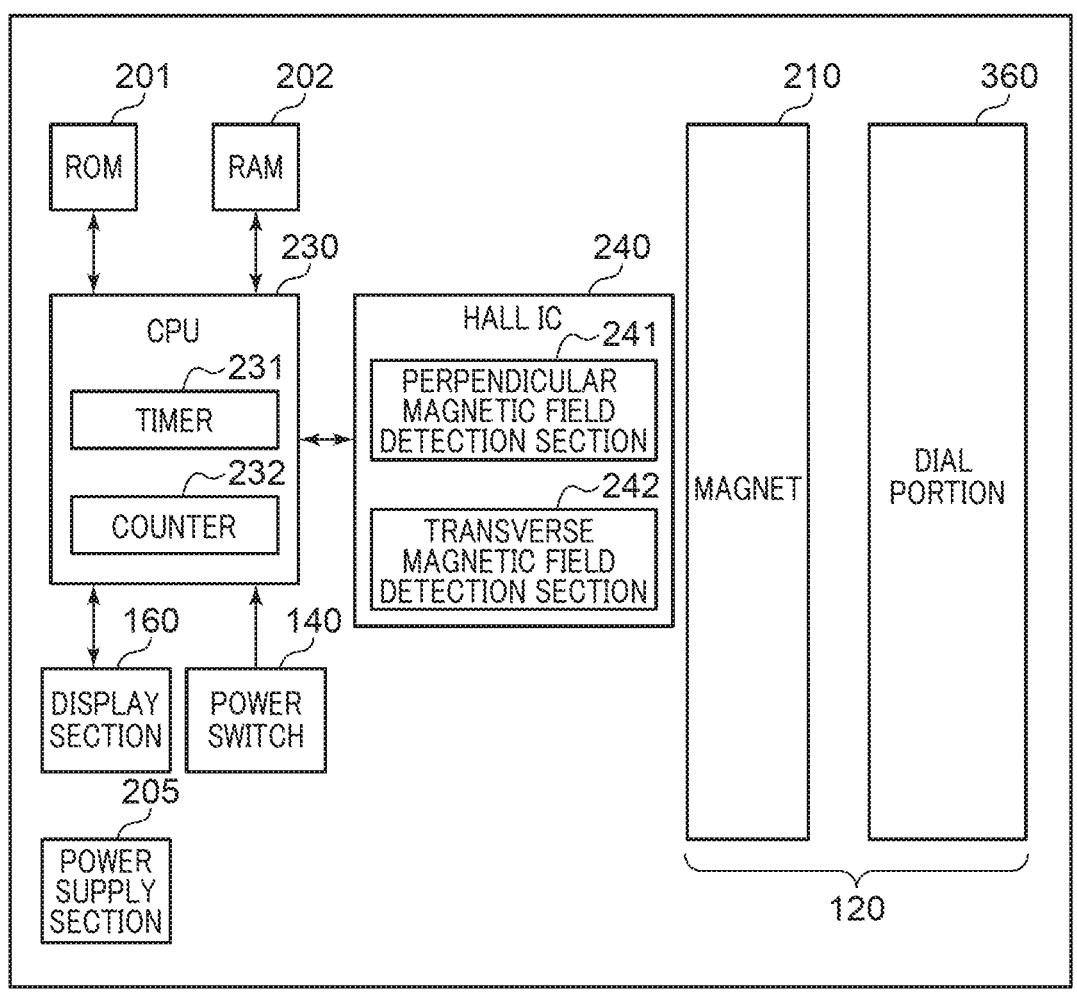
FIG. 2 is a block diagram showing the configuration of the digital camera shown in FIGS. 1A and 1B.

FIG. 2 is a block diagram showing the configuration of the camera shown in FIGS. 1A and 1B. Note that the same component elements in FIG. 2 as those in FIGS. 1A and 1B are denoted by the same reference numerals.

The camera 100 is provided with a nonvolatile memory (ROM) 201, and the nonvolatile memory 201 stores programs which operate on a CPU 230. In the illustrated example, a Flash-ROM is used as the nonvolatile memory 201, but any other memory may be used insofar as it is a nonvolatile memory.

A RAM 202 is used as an image buffer for temporarily storing an image obtained through photographing. Further, the RAM 202 is also used when temporarily storing image data obtained as a result of image processing. Further, the RAM 202 is also used as a work memory for the CPU 230. Note that any other memory other than the RAM may be used insofar as it can be accessed at a sufficient access speed.

A power supply section 205 has a battery, an AC adapter, and so forth, and supplies power to the components of the camera 100 directly or via a DC-DC converter (not shown).

The power switch 140 has a mechanical on-position and a mechanical off-position. Note that the power switch 140 may be e.g. a push switch or an electrical switch. In a state in which the power switch 140 is off, even when the camera 100 is in a state having the power supply section 205 inserted therein, the camera 100 does not function and is held in a low-power consumption state. When the power switch 140 is turned on in the state of the camera 100 in which the power supply section 205 has been inserted therein, the camera 100 functions as a camera.

The CPU 230 controls the overall operation of the camera. Further, the CPU 230 changes various settings, such as a shutter speed and an aperture value and further changes display on the display device 160, according to an operation of the dial, denoted by reference numeral 120, which is detected by a Hall IC 240, referred to hereinafter.

The CPU 230 is provided with a timer 231 and a counter 232. Note that at least one of the timer 231 and the counter 232 may be externally attached to the CPU 230.

The timer 231 starts time counting in response to an instruction from the CPU 230 and terminates time counting in response to an instruction from the CPU 230. Further, the timer 231 may be continuously operated to periodically generate an interrupt to the CPU 230 at predetermined time intervals.

The counter 232 counts the number of operations of the dial 120. Note that the counter 232 may count not only the number of operations of the dial 120, but also the number of operations of other operation sections.

The Hall IC 240 is a magnetic sensor IC including a transverse magnetic field detection section 242 for detecting a magnetic field in a specific direction and a perpendicular magnetic field detection section 241 for detecting a magnetic field in a direction perpendicular to the specific direction. Although in the illustrated example, the Hall IC 240 is externally attached to the CPU 230, the Hall IC 240 may be incorporated in the CPU 230.

The transverse magnetic field detection section 242 and the perpendicular magnetic field detection section 241 each have an upper limit threshold value and a lower limit threshold value set therein. In a case where the magnetic flux density becomes higher than the upper limit threshold value or becomes lower than the lower limit threshold value, the transverse magnetic field detection section 242 and the perpendicular magnetic field detection section 241 each output a detection signal. In the following description, the transverse magnetic field detection section 242 outputs a first transverse detection signal when the magnetic flux density becomes higher than the upper limit threshold value and outputs a second transverse detection signal when the magnetic flux density becomes lower than the lower limit threshold value. Further, the perpendicular magnetic field detection section 241 outputs a first perpendicular detection signal when the magnetic flux density becomes higher than the upper limit threshold value and outputs a second perpendicular detection signal when the magnetic flux density becomes lower than the lower limit threshold value.

Note that the CPU 230 can read out the detected magnetic flux density detected by the transverse magnetic field detection section 242 or the perpendicular magnetic field detection section 241 at a predetermined timing. Further, although in the illustrated example, the Hall IC 240 is used as a rotation detection section, any other suitable rotation detection element, such as a MR sensor, may be used.

A magnet 210 is a ring-shaped permanent magnet and has S poles and N poles magnetized in a direction along the central axis thereof at a predetermined pitch alternately along its circumference (outer periphery). The magnet 210 rotates in unison with the dial portion 360. A change in the magnetic flux density of the magnet 210 is detected by the Hall IC 240 and the CPU 230 determines a direction of rotation and an amount of rotation of the dial 120 according to a result of the detection. Note that the dial 120 is formed by the dial portion 360, the magnet 210, and so forth, as described hereinafter.

Figure 3A:
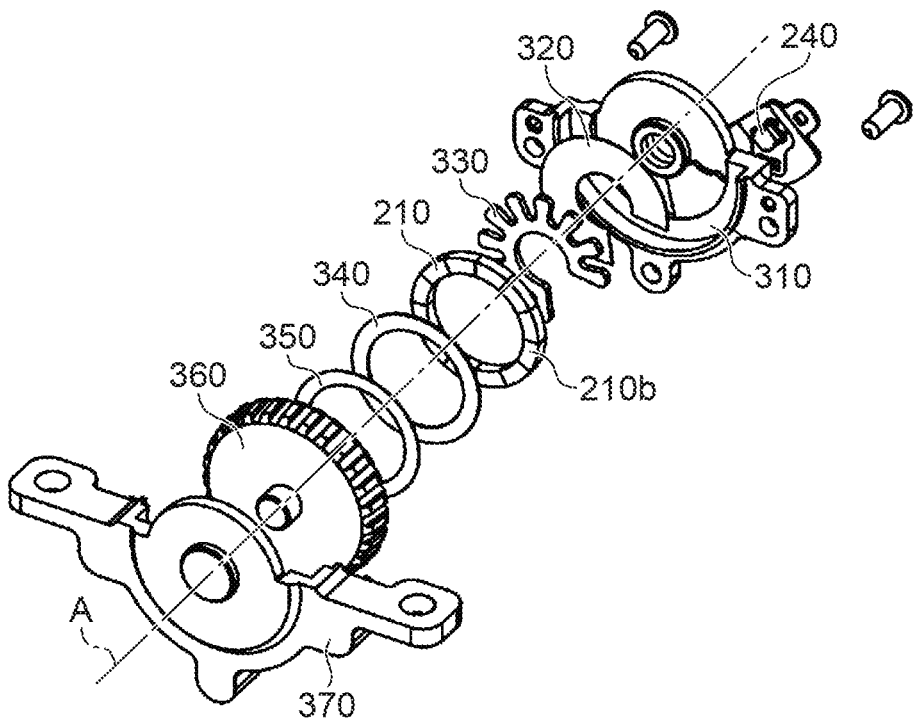
FIGS. 3A and 3B are views useful in explaining the construction of a dial appearing in FIGS. 1A and 2.
Figure 3B:
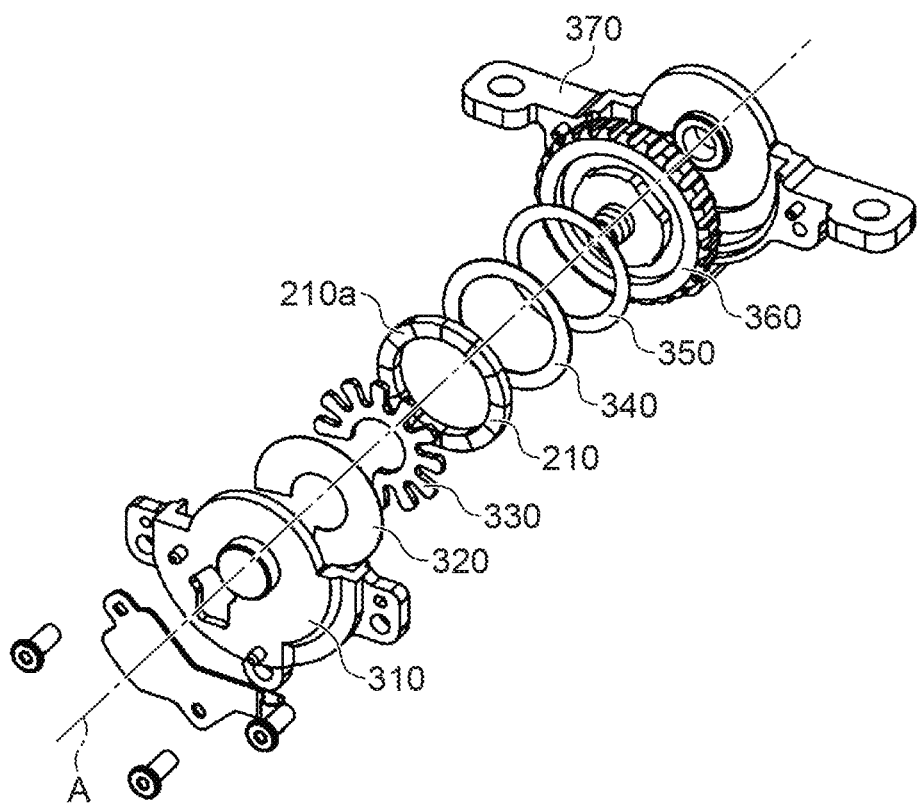

FIGS. 3A and 3B are views useful in explaining the construction of the dial 120 appearing in FIGS. 1A and 2. FIG. 3A is an exploded perspective view of the dial 120, as viewed from the front, and FIG. 3B is an exploded perspective view of the dial 120, as viewed from the rear.

The dial portion 120 is a rotation operation member operated by a user and rotates about a rotational axis A. As described above, the magnet 210 is ring-shaped, and has S pole and the N pole alternately magnetized at the predetermined pitches along its circumference. Further, the direction of magnetizing the magnet 210 is parallel to the rotational axis A.

The magnet 210 has a first magnetized surface 210a and a second magnetized surface 210b. Here, a surface of the magnet 210, appearing in FIG. 3A, is defined as the second magnetized surface 210b and a surface of the magnet 210, appearing in FIG. 3B, is defined as the first magnetized surface 210a. Although in the illustrated example, the magnet 210 is divided into 12 magnetized portions, and the number of magnetized portions is not limited to 12. The magnet 210 is fixed inside the dial portion 360 and rotates in unison with the dial portion 360.

A shield member 340 is a magnetic body, fixed inside the dial portion 360 by a fixing member 350, and rotates in unison with the dial portion 360. Further, the shield member 340 is fixed in contact with the second magnetized surface 210b of the magnet 210. The shield member 340 prevents magnetic force generated from the magnet 210 from leaking outside. Further, the shield member 340 prevents external magnetic force from acting as noise in magnetic detection performed by the Hall IC 240.

Note that in the illustrated example, an iron material exhibiting magnetism, such as an SPCC material, is used for the shield member 340.

A yoke 330 is a magnetic body having a plurality of tooth portions 331 (see FIGS. 7A and 7B), as described hereinafter. The yoke 330 is disposed in an opposed relation to the first magnetized surface 210a of the magnet 210 and is fixed to a base member 310 by a yoke fixing member 320. With this arrangement, an operating physical force is generated by changes in an attracting force between the yoke 330 and the magnet 210. Note that in the illustrated example, an iron material exhibiting magnetism, such as an SPCC material, is used for the yoke 330.

A cover member 370 is fixed to the base member 310, and the base member 310 and the cover member 370 rotatably hold the dial portion 360 about the rotational axis A.

The Hall IC 240 has its detection surface disposed in an opposed relation to the first magnetized surface 210a of the magnet 210 and is fixed to the base member 310. When the dial portion 360 is rotated, the Hall IC 240 detects a direction of rotation and an amount of rotation of the dial portion 360 based on a magnetic field in a direction parallel to the rotational axis A (perpendicular magnetic field) and a magnetic field in a circumferential direction of the magnet 210 (transverse magnetic field).

Although in the illustrated example, the Hall IC 240 capable of detecting magnetic forces in the two axes is used as the rotation detection section, the rotation detection section is not limited to this, but any other suitable rotation detection section can be used insofar as it can detect the rotational direction and the rotational amount of the dial portion 360. For example, rotation may be detected by arranging two Hall elements at different phases with respect to the magnet 210.

Figure 4A:
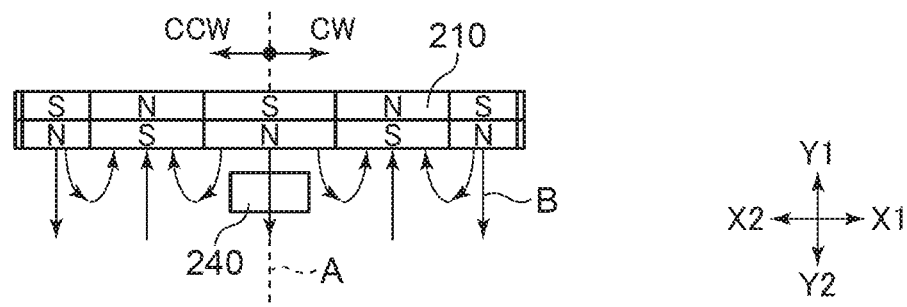
FIGS. 4A to 4D are diagrams useful in explaining a magnetic field of a magnet appearing in FIGS. 3A and 3B and detection of the magnetic field by a Hall IC.
Figure 4B:
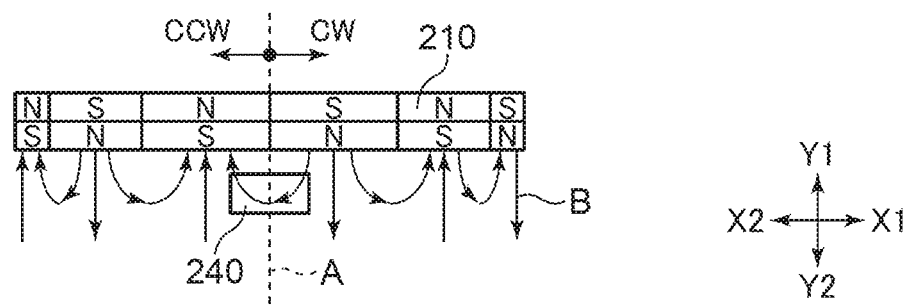
Figure 4C:
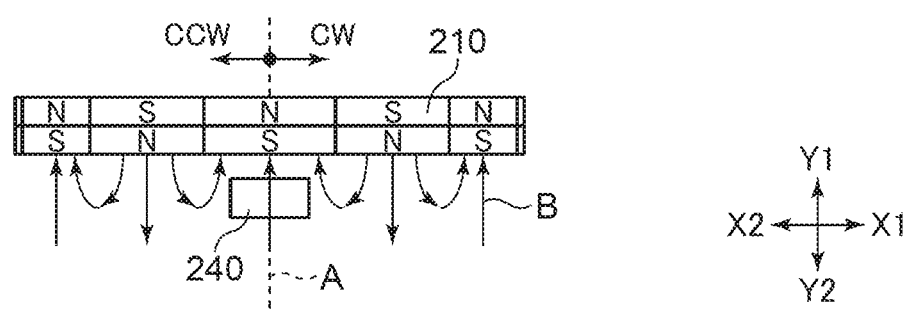
Figure 4D:
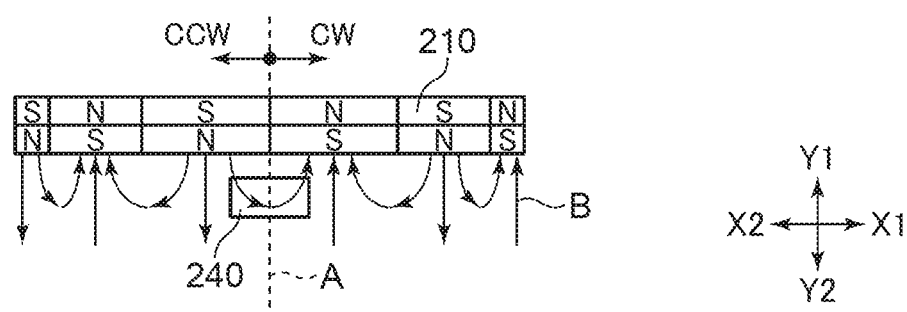

FIGS. 4A to 4D are diagrams useful in explaining the magnetic field of the magnet 210 appearing in FIGS. 3A and 3B and detection of the magnetic field by the Hall IC 240. FIG. 4A shows a state in which the Hall IC 240 is directly opposed to the N pole of a magnetized portion of the magnet 210. FIG. 4B shows a state in which the magnet 210 has been rotated by an amount corresponding to a half of the circumferential length of the magnetized portion from the state shown in FIG. 4A in the CW (clockwise) direction and the Hall IC 240 is directly opposed to an intermediate portion between the N pole of the magnetized portion and the S pole of a magnetized portion adjacent thereto of the magnet 210. FIG. 4C shows a state in which the magnet 210 has been further rotated by the amount corresponding to the half of the circumferential length of the magnetized portion from the state shown in FIG. 4B in the CW direction and the Hall IC 240 is directly opposed to the S pole of the magnetized portion of the magnet 210. FIG. 4D shows a state in which the magnet 210 has been further rotated by the amount corresponding to the half of the circumferential length of the magnetized portion from the state shown in FIG. 4C in the CW direction and the Hall IC 240 is directly opposed to an intermediate portion between the S pole of the magnetized portion and the N pole of a magnetized portion adjacent thereto of the magnet 210.

FIGS. 4A to 4D each show the state of the magnet 210 and the Hall IC 240, as viewed from a direction perpendicular to the rotational axis A. Further, an arrow B indicates a magnetic flux. A magnetic field in X1 and X2 directions indicates a transverse magnetic field and a magnetic field in Y1 and Y2 directions indicates a perpendicular magnetic field.

Referring to FIG. 4A, a magnetic flux in the Y2 direction is input to the Hall IC 240. Referring to FIG. 4B, a magnetic flux in the X2 direction is input to the Hall IC 240. Referring to FIG. 4C, a magnetic flux in the Y1 direction is input to the Hall IC 240. Referring to FIG. 4D, a magnetic flux in the X1 direction is input to the Hall IC 240. When the magnet 210 is further rotated by the amount corresponding to the half of the circumferential length of the magnetized portion from the state shown in FIG. 4D in the CW direction, the magnet 210 and the Hall IC 240 are shifted to the same state as shown in FIG. 4A.

An amount of rotation of the magnet 210 is detected according to a change in the pole directly opposed to the Hall IC 240. Further, the direction of rotation of the magnet 210 is detected according to a change in the direction of the magnetic field detected by the Hall IC 240.

For example, in a case where the state shown in FIG. 4A is shifted to the state shown in FIG. 4C through the state shown in FIG. 4B, the direction of the magnetic field detected by the Hall IC 240 changes from Y2 to Y1 through X2. At this time, the Hall IC 240 is shifted from the state directly opposed to the N pole to the state directly opposed to the S pole and hence an amount corresponding to the circumferential length of one magnetized portion is detected as the amount of rotation of the magnet 210. Further, the direction of the magnetic field detected by the Hall IC 240 changes from Y2 to Y1 through X2 and hence the direction of rotation of the magnet 210 is detected as the CW direction.

Figure 5A:
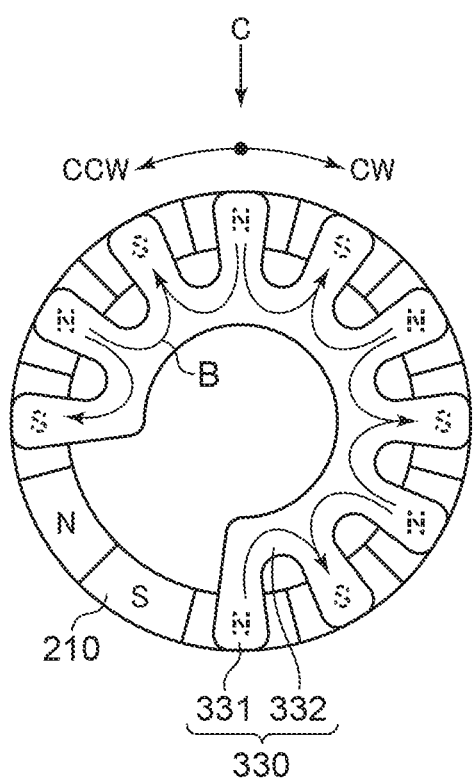
FIGS. 5A to 5E are diagrams useful in explaining an operating physical force generated by the magnetic field of the magnet and a yoke appearing in FIGS. 3A and 3B.
Figure 5B:
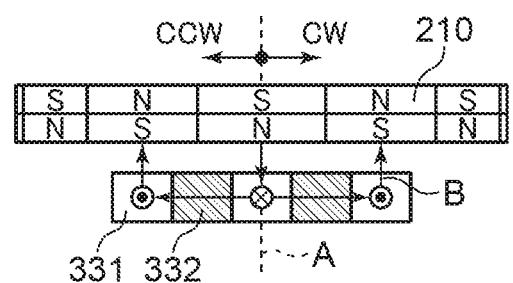
Figure 5C:
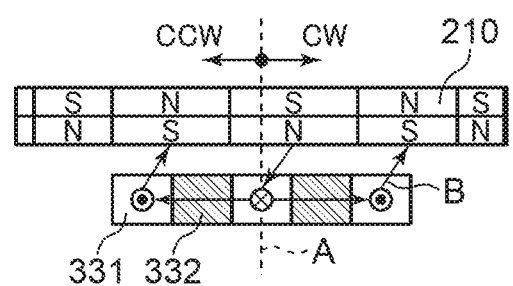
Figure 5D:
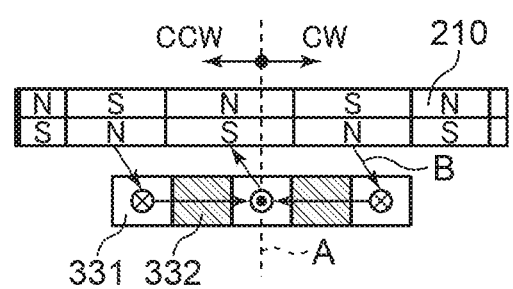
Figure 5E:
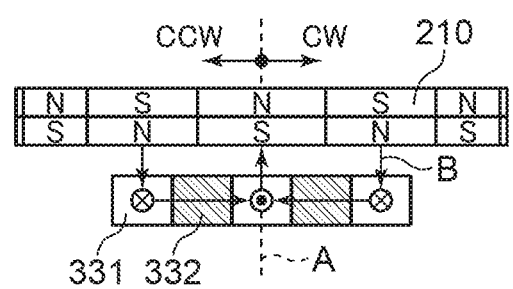

FIGS. 5A to 5E are diagrams useful in explaining the operating physical force generated by the magnetic field of the magnet 120 and the yoke 330 appearing in FIGS. 3A and 3B. FIG. 5A shows a state in which the magnet 210 and the yoke 330 magnetically attract each other, and the tooth portions 331 of the yoke 330 are directly opposed to the poles of the magnetized portions, respectively. FIG. 5B shows the magnet 210 and the yoke 330, as viewed in a direction indicated by an arrow C in FIG. 5A. FIG. 5C shows a state in which the magnet 210 has been rotated from the state shown in FIG. 5B in the CW direction to a position before each tooth portion 331 of the yoke 330 is opposed to the magnetic pole of each next magnetized portion. FIG. 5D shows a state in which the magnet 210 has been rotated from the state shown in FIG. 5C in the CW direction and each tooth portion 331 of the yoke 330 starts to be opposed to the magnetic pole of the next magnetized portion. FIG. 5E shows a state in which the magnet 210 has been rotated from the state shown in FIG. 5D in the CW direction and each tooth portion 331 of the yoke 330 is directly opposed to the magnetic pole of the next magnetized portion.

In FIGS. 5B to 5E, A indicates the rotational axis of the magnet 210, and an arrow B indicates a magnetic flux. Further, the yoke 330 has the plurality of tooth portions 331 and a connection portion 332 connecting the plurality of tooth portions 331.

Although the dial portion 360 is not illustrated in FIGS. 5A to 5E, since the magnet 210 rotates in unison with the dial portion 360, a series of movements shown in FIGS. 5B, 5C, 5D, and 5E correspond to movement of one click of the dial portion 360. Assuming that FIG. 5B shows the state of a first stop point, FIG. 5E shows the state of a second stop point.

Referring to FIG. 5A, the magnetic flux generated from the magnet 210 flows from one of the tooth portions 331 of the yoke 330 into adjacent ones of the tooth portions 331 via the connection portion 332, whereby the magnetic field formed by each adjacent N pole and S pole is closed.

Referring to FIG. 5B, the magnet 210 and the yoke 330 attract each other but no force in the CW or CCW direction is applied to the magnet 210.

Referring to FIG. 5C, since the magnet 210 has been rotated from the state shown in FIG. 5B in the CW direction, the magnet 210 receives a force in the CCW direction due to magnetic attraction between the magnet 210 and the yoke 330. This force is a force in a direction opposite to the rotational direction and hence the user feels a resistance to his/her handling operation.

Referring to FIG. 5D, the magnet 210 has been rotated from the state shown in FIG. 5C in the CW direction, and each tooth portion 331 approaches a position opposed to the magnetic pole of the next magnetized portion. As a result, the magnet 210 receives a force in the CW direction due to magnetic attraction between the magnet 210 and the yoke 330. This force is a force in the same direction as the rotational direction, and the user feels a force drawing the dial portion 360 toward the second stop position as the user performs his/her handling operation. The force generated by the magnet 210 and the yoke 330 as they are shifted from the state shown in FIG. 5B while overcoming the resistance felt in the state shown in FIG. 5C to the state shown in FIG. 5E in which the second stop point is reached is the operating physical force.

Figure 6A:
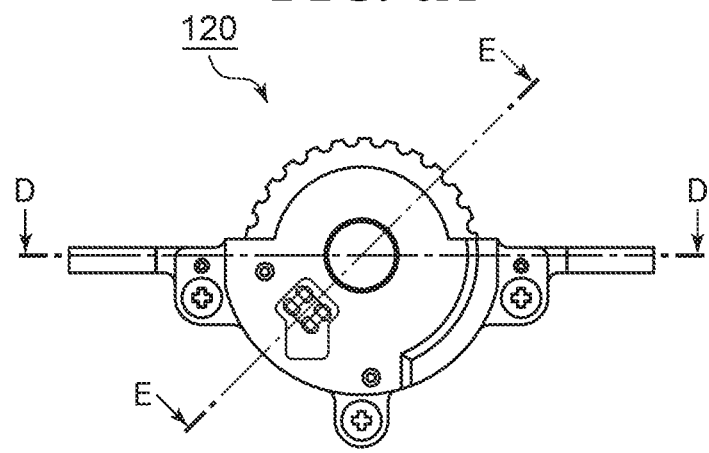
FIGS. 6A to 6C are views useful in explaining the dial shown in FIGS. 3A and 3B.
Figure 6B:
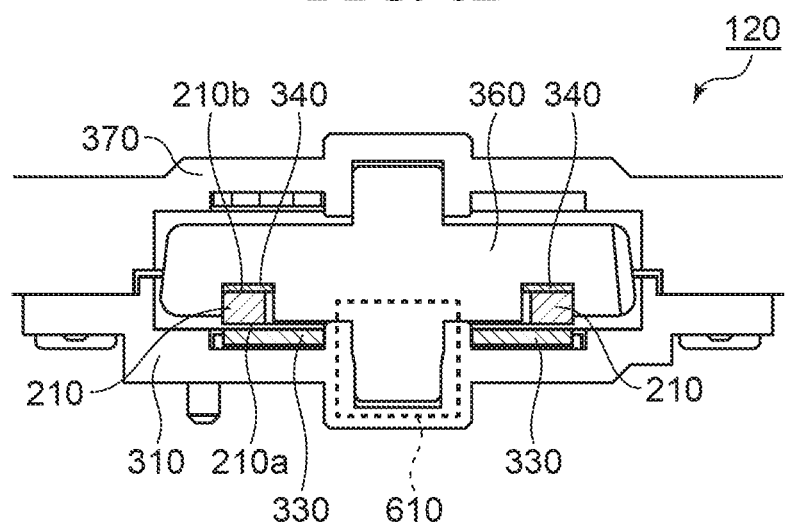
Figure 6C:
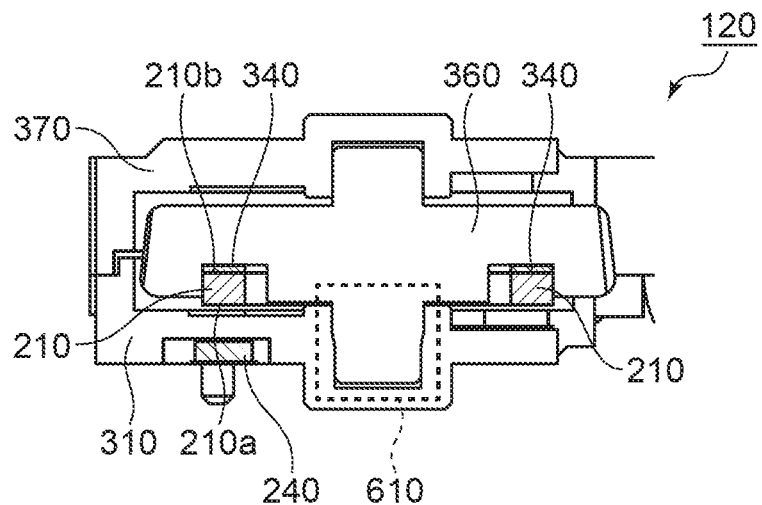

FIGS. 6A to 6C are views useful in explaining the dial 120, shown in FIGS. 3A and 3B. FIG. 6A is a view of the dial 120, as viewed from the rotational axis. FIG. 6B is a cross-sectional view taken along D-D in FIG. 6A. FIG. 6C is a cross-sectional view taken along E-E in FIG. 6A.

As shown in FIG. 6B, the yoke 330 is disposed in an opposed relation to the first magnetized surface 210a of the magnet 210 with a predetermined gap between the magnet 210 and the yoke 330. Further, the shield member 340 is disposed in contact with the second magnetized surface 210b of the magnet 210. The shield member 340 prevents a magnetic field generated from the magnet 210 from leaking upward, as viewed in FIG. 6B and increase the strength of the magnetic field downward, as viewed in FIG. 6B. Therefore, the magnetic force, stronger than in a case without the shield member 340, acts on the yoke 330, whereby the operating physical force becomes stronger. The dial portion 360 is rotatably held in a slide fitting portion 610 formed in the base member 310.

As shown in FIG. 6C, the Hall IC 240 is disposed in an opposed relation to the first magnetized surface 210a of the magnet 210 with a predetermined gap between the magnet 210 and the Hall IC 240. Further, since the magnetic field generated downward from the magnet 210, as viewed in FIG. 6C, is strengthened by the shield member 340, the magnetic field can be more positively detected by the Hall IC 240.

As described with reference to FIGS. 6B and 6C, by disposing the yoke 330 and the Hall IC 240 on the same side with respect to the magnet 210, it is possible to reduce the size of the dial 120.

Figure 7A:
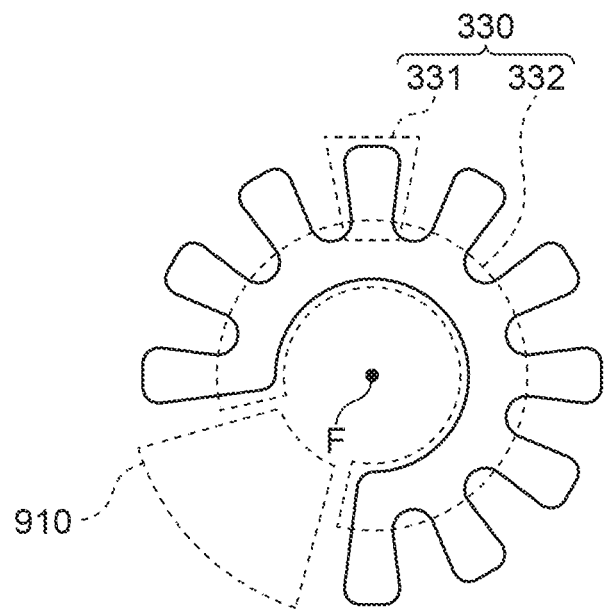
FIGS. 7A and 7B are views useful in explaining a relationship between the magnet and the yoke appearing in FIGS. 3A and 3B.
Figure 7B:
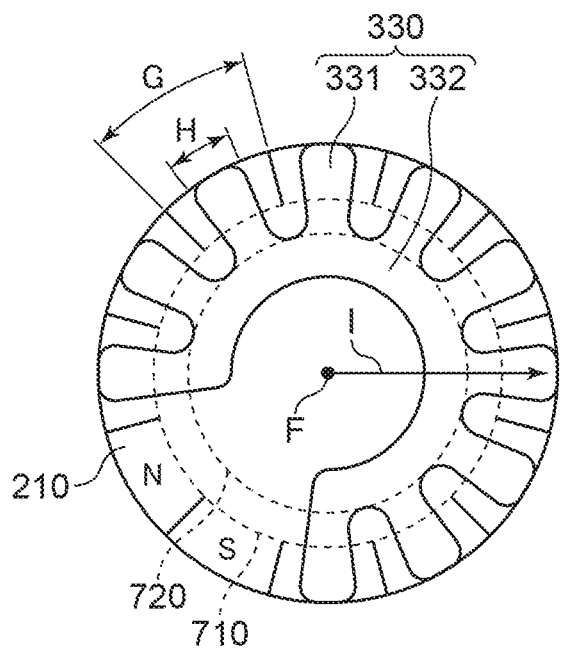

FIGS. 7A and 7B are views useful in explaining a relationship between the magnet 210 and the yoke 330. FIG. 7A shows the yoke 330 in detail, and FIG. 7B shows the relationship between the magnet 210 and the yoke 330.

As shown in FIG. 7A, the yoke 330 has the plurality of tooth portions 331 and the connection portion 332 connecting these. The plurality of tooth portions 331 are arranged such that they protrude radially outward with a point F as the center of the radiation pattern. Further, respective ends of the plurality of tooth portions 331, toward the point F, are connected by the connection portion 332. Further, to enable the Hall IC 240 to detect the magnetic field, a space 910, where there are no tooth portion 331, is defined in the yoke 330.

Referring to FIG. 7B, the tooth portions 331 of the yoke 330 are arranged at intervals of the same distance as a magnetization pitch G of the magnet 210. Therefore, when rotation is stopped, all of the tooth portions 331 are each directly opposed to either the N pole or the S pole of the magnet 210. Although in the yoke 330, the width H of each tooth portion 331 corresponds to a half of the magnetization pitch G of the magnet 210, this is not limitative, but the width H may be larger or smaller than the magnetization pitch G.

The strength of the above-mentioned operating physical force varies with the width H of each tooth portion 331 of the yoke 330, and hence if the width H is too large, the magnetic field is liable to be affected by a magnetic pole adjacent to the magnetic pole opposed to the tooth portion 331, which reduces the strength of the operating physical force. On the other hand, if the width H is too small, part on which the magnetic force of the magnet 210 acts is reduced and hence the strength of the operating physical force is reduced. For this reason, it is desirable that the width H is approximately the half of the magnetization pitch G.

In FIG. 7B, the diameter of a magnet inner circumference 710 (inner diameter of the magnet 210) is larger than the diameter of a connection portion outer circumference 720 (outer diameter of the connection portion 332) of the yoke 330. Therefore, the magnetic flux generated from the magnet 210 flows into the tooth portions 331 closer to the magnet 210 and hardly flows directly into the connection portion 332.

A distance from the center point F to the tip end of each tooth portion 331 of the yoke 330, i.e. the radius I of the outer circumference of the tooth portions 331 is substantially equal to the radius of the outer circumference of the magnet 210. If the radius I of the outer circumference of the tooth portions 331 is larger than the radius of the outer circumference of the magnet 210, a magnetic flux generated from the magnet 210 flows from the tooth portions 331 not only toward the connection portion 332, and hence it is impossible to obtain a proper operating physical force.

On the other hand, if the radius I of the outer circumference of the tooth portions 331 is smaller than the radius of the outer circumference of the magnet 210, an area of the yoke 330, on which the magnetic force of the magnet 210 acts, is reduced, and hence it is impossible to obtain a proper operating physical force. For this reason, it is desirable that the radius I of the outer circumference of the tooth portions 331 is substantially equal to the radius of the outer circumference of the magnet 210.

Figure 8A:
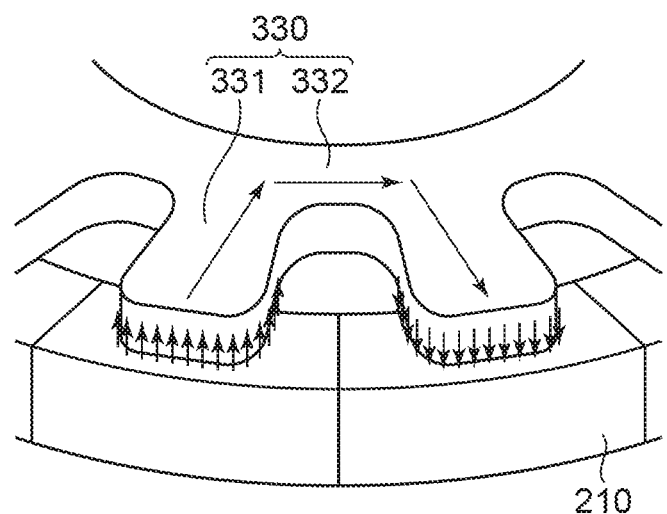
FIGS. 8A and 8B are views useful in explaining how the magnet and the yoke appearing in FIGS. 3A and 3B have influence on the magnetic flux density in tooth portions.
Figure 8B:
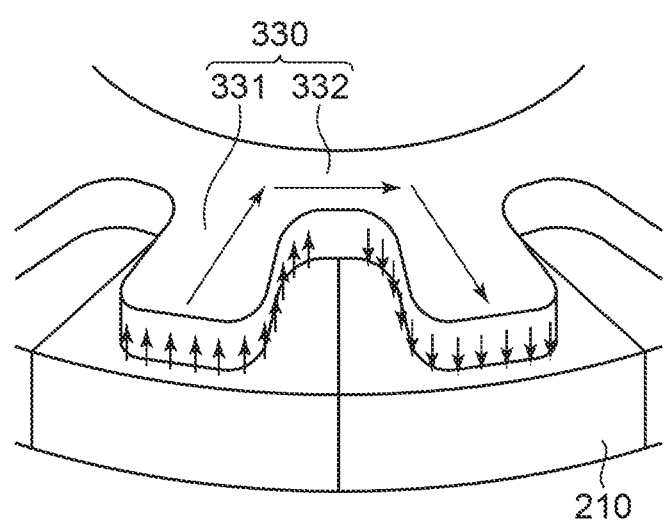

FIGS. 8A and 8B are views useful in explaining how the magnet 210 and the yoke 330 have influence on the magnetic flux density in the tooth portions 331. FIG. 8A shows the magnetic flux density in the tooth portions 331 in a case where the diameter of the magnet inner circumference 710 is larger than the diameter of the connection portion outer circumference 720 of the yoke 330. FIG. 8B shows the magnetic flux density in the tooth portions 331 in a case where the diameter of the magnet inner circumference 710 is smaller than the diameter of the connection portion outer circumference 720 of the yoke 330.

Referring to FIG. 8A, in the illustrated example, the diameter of the magnet inner circumference 710 is larger than the diameter of the connection portion outer circumference 720 of the yoke 330. For this reason, a space between the magnet 210 and the connection portion 332 is increased so that the magnetic resistance in this space is increased. This prevents the magnetic flux generated from the magnet 210 from directly flowing into the connection portion 332. Further, the magnetic flux flowing into the connection portion 332 via each tooth portion 331 is prevented from directly flowing from the connection portion 332 into the magnet 210.

As a result, the magnetic flux generated from the magnet 210 flows from each tooth portion 331 to the adjacent tooth portion 331 via the connection portion 332 without being stagnated. Therefore, the strong magnetic force acts on the tooth portions 331, which increases the strength of the attracting force between the magnet 210 and the tooth portions 331, whereby it is possible to obtain a stronger and proper operating physical force.

Referring to FIG. 8B, in the illustrated example, the diameter of the magnet inner circumference 710 is smaller than the diameter of the connection portion outer circumference 720 of the yoke 330. For this reason, the space between the magnet 210 and the connection portion 332 is reduced and the magnetic resistance in this space is lowered. As a result, the magnetic flux generated from the magnet 210 directly flows into the connection portion 332. Further, the magnetic flux flowing into the connection portion 332 via each tooth portion 331 can flow from the connection portion 332 toward the magnet 210.

Therefore, the magnetic flux which is to flow from each tooth portion 331 to the adjacent tooth portion 331 via the connection portion 332 without being stagnated partially flows toward the magnet 210 before reaching the tip end of the adjacent tooth portion 331. Therefore, the magnet flux density in the tooth portions 331 is lowered, which reduces the strength of the attracting force between the magnet 210 and the tooth portions 331, so that it is impossible to obtain a proper operating physical force.

Figure 9:
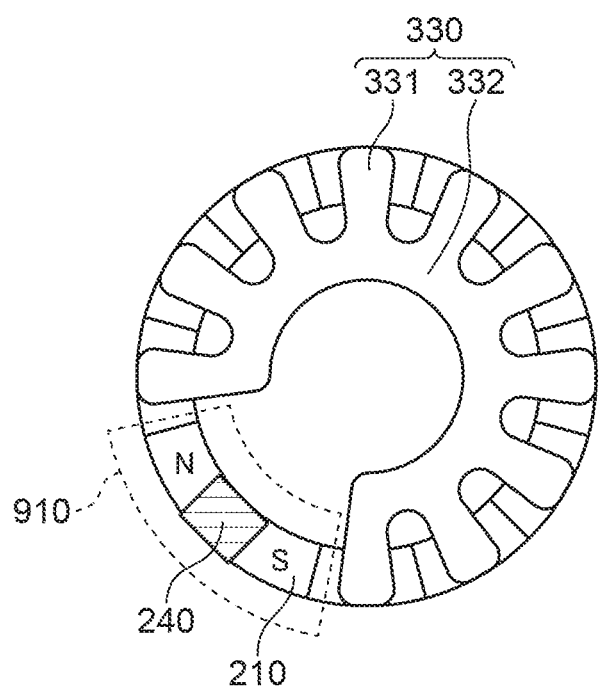
FIG. 9 is a view showing a positional relationship between the magnet, the yoke, and the Hall IC, appearing in FIGS. 3A and 3B.

FIG. 9 is a view showing a positional relationship between the magnet 210, the yoke 330, and the Hall IC 240.

As shown in FIG. 9, the Hall IC 240 is disposed within the space 910 where there are no tooth portions 331 of the yoke 330. This makes it possible to provide a magnetic field generated by the magnet 210 for the Hall IC 240 without being interfered by the yoke 330 to enable the Hall IC 240 to positively detect the magnetic field.

As described above, in the first embodiment of the present invention, it is possible not only to reduce the size of the dial, but also to obtain a proper operating physical force when operating the dial.

Next, a description will be given of a digital camera as an electronic apparatus according to a second embodiment of the present invention. Note that the digital camera as the electronic apparatus according to the second embodiment has the same configuration as that of the camera shown in FIGS. 1A, 1B, and 2.

The second embodiment differs from the first embodiment in the shape of the yoke 330 and is the same in the other respects of the configuration as the first embodiment. More specifically, in the first embodiment, as described hereinabove with reference to FIGS. 5A to 5E, the plurality of tooth portions 331 radially protrude outward from the connection portion 332. On the other hand, in the second embodiment, the plurality of tooth portions 331 radially protrude inward from the connection portion 332, as described hereinafter.

Figure 10A:
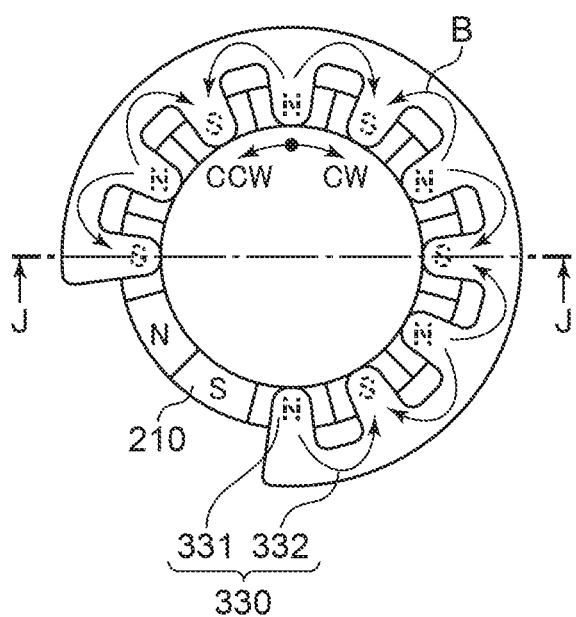
FIGS. 10A to 10E are diagrams useful in explaining an operating physical force generated by the magnetic field of a magnet and a yoke, in a digital camera as an electronic apparatus according to a second embodiment of the present invention.
Figure 10B:
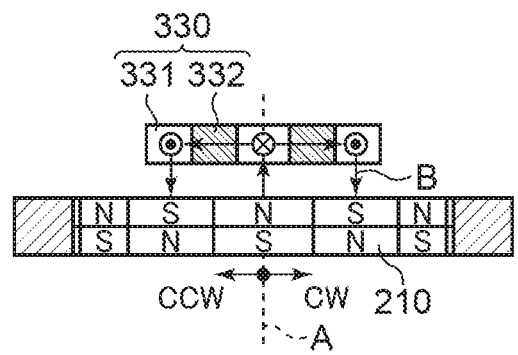
Figure 10C:
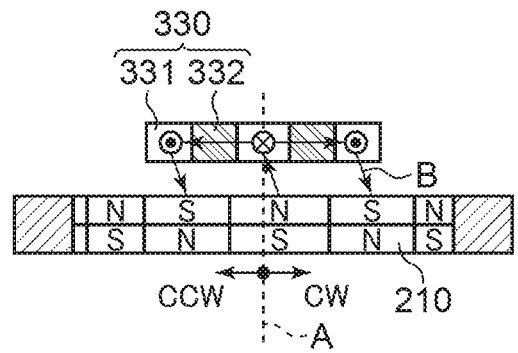
Figure 10D:
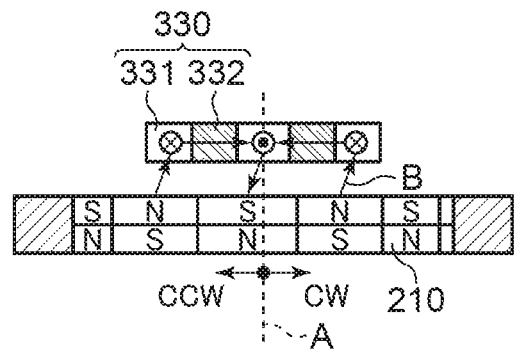
Figure 10E:
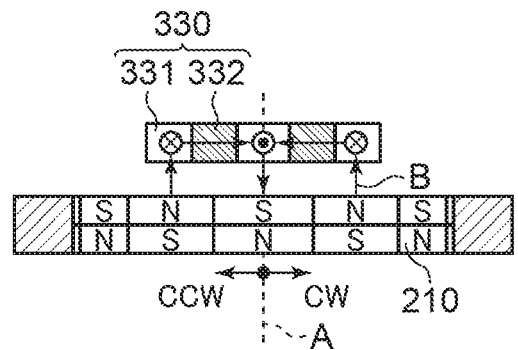

FIGS. 10A to 10E are diagrams useful in explaining the operating physical force generated by the magnetic field of the magnet 210 and the yoke 330, in the camera as the electronic apparatus according to the second embodiment of the present invention. FIG. 10A shows a state of the magnet 210 and the yoke 330 in which the magnet 210 and the yoke 330 magnetically attract each other and the tooth portions 331 of the yoke 330 are directly opposed to the magnetic poles, respectively. FIG. 10B shows a state of the magnet 210 and the yoke 330, as viewed from a plane taken along J-J, in a direction indicated by arrows J in FIG. 10A. FIG. 10C shows a state in which the magnet 210 has been rotated from the state shown in FIG. 10B in the CW direction before each tooth portion 331 of the yoke 330 is opposed to the magnetic pole of the next magnetized portion. FIG. 10D shows a state in which the magnet 210 has been rotated from the state shown in FIG. 10C in the CW direction and each tooth portion 331 of the yoke 330 starts to be opposed to the magnetic pole of the next magnetized portion. FIG. 10E shows a state in which the magnet 210 has been rotated from the state shown in FIG. 10D in the CW direction and each tooth portion 331 of the yoke 330 is directly opposed to the next magnetic pole.

Note that in FIGS. 10A to 10E, the same component elements as those in FIGS. 5A to 5E are denoted by the same reference numerals.

Although the dial portion 360 is not shown in FIGS. 10A to 10E, as described hereinabove, the magnet 210 rotates in unison with the dial portion 360. In this illustrated example as well, assuming that FIG. 10B shows the state of-a first stop point, FIG. 10E shows the state of a second stop point.

Referring to FIG. 10A, the magnetic flux generated from the magnet 210 flows from one of the tooth portions 331 of the yoke 330 into adjacent ones of the adjacent tooth portions 331 via the connection portion 332, whereby the magnetic field formed by each adjacent N pole and S pole is closed.

Referring to FIG. 10B, the magnet 210 and the yoke 330 attract each other, and no force in the CW or CCW direction is applied to the magnet 210.

Referring to FIG. 10C, when the magnet 210 has been rotated from the state shown in FIG. 10B in the CW direction, the magnet 210 receives a force in the CCW direction due to magnetic attraction between the magnet 210 and the yoke 330. This force is a force in a direction opposite to the rotational direction and hence the user feels a resistance to his/her handling operation.

Referring to FIG. 10D, when the magnet 210 has been rotated from the state shown in FIG. 10C in the CW direction and each tooth portion 331 of the yoke 330 starts to be opposed to the magnetic pole of the next magnetized portion, the magnet 210 receives a force in the CW direction due to magnetic attraction between the magnet 210 and the yoke 330. This force is a force in the same direction as the rotational direction, and the user feels a force drawing the dial portion 360 toward the second stop position as the user performs his/her handling operation. A force generated by the magnet 210 and the yoke 330 as they are shifted from the state shown in FIG. 10B while overcoming the resistance felt in the state shown in FIG. 10C to the state shown in FIG. 10E in which the second stop point is reached is the operating physical force.

Figure 11A:
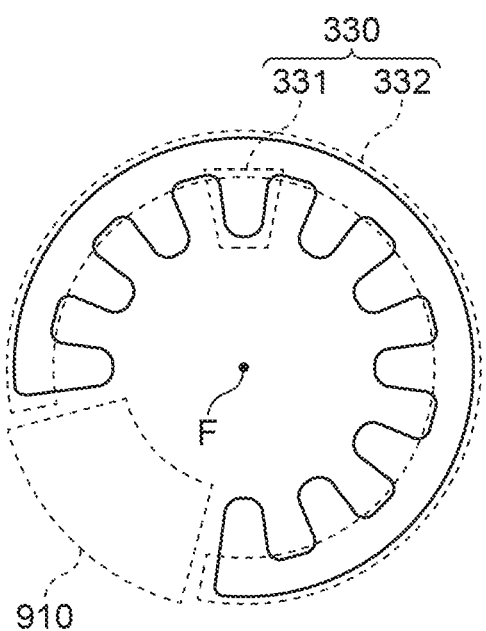
FIGS. 11A and 11B are views useful in explaining a relationship between the magnet and the yoke, appearing in FIGS. 10A to 10E.
Figure 11B:
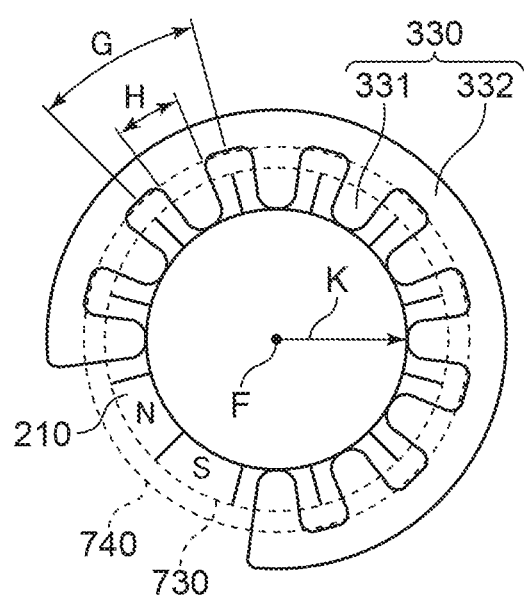

FIGS. 11A and 11B are views useful in explaining a relationship between the magnet 210 and the yoke 330, shown in FIGS. 10A to 10E. FIG. 11A shows the yoke 330 in detail, and FIG. 11B shows the relationship between the magnet 210 and the yoke 330. Note that in FIGS. 11A and 11B, the same component elements as those in FIGS. 7A and 7B are denoted by the same reference numerals.

As shown in FIG. 11A, the plurality of tooth portions 331 are arranged such that they protrude radially inward, with the point F as the center of the radiation pattern. Further, respective ends of the plurality of tooth portions 331 on a side opposite to a side toward the center point F, are connected by the connection portion 332. Further, to enable the Hall IC 240 to detect the magnetic field, the space 910 where there are no tooth portion 331 is defined in the yoke 330.

Referring to FIG. 11B, the tooth portions 331 are arranged at intervals of the same distance as the magnetization pitch G of the magnet 210. Therefore, when rotation is stopped, all of the tooth portions 331 are each directly opposed to either the N-pole or the S-pole of the magnet 210. In the illustrated example, the width H of each tooth portion 331 of the yoke 330 corresponds to a half of the magnetization pitch G of the magnet 210. However, the width H may be larger or smaller than the magnetization pitch G. Further, the strength of the operating physical force varies with the width H of each tooth portion 331.

Incidentally, as described hereinabove, if the width H is too large, the magnetic field is liable to be affected by a magnetic pole adjacent to the magnetic pole opposed to each tooth portion 331, which reduces the strength of the operating physical force. On the other hand, if the width H is too small, part on which the magnetic force of the magnet 210 acts is reduced and hence the strength of the operating physical force is reduced. For this reason, it is desirable that the width H is approximately the half of the magnetization pitch G.

The diameter of a magnet outer circumference 730 (outer diameter of the magnet 210) is smaller than the diameter of a connection portion inner circumference 740 (inner diameter of the connection portion 332) of the yoke 330. Therefore, the magnetic flux generated from the magnet 210 flows into the tooth portions 331 closer to the magnet 210, and hardly flows directly into the connection portion 332.

A distance K from the center point F to the tip end of each tooth portion 331 of the yoke 330, i.e. the radius K of the inner circumference of the tooth portions 331 is substantially equal to the radius of the inner circumference of the magnet 210. If the distance K is smaller than the radius of the inner circumference of the magnet 210, a magnetic flux generated from the magnet 210 flows from the tooth portions 331 not only toward the connection portion 332. Therefore, it is impossible to obtain a proper operating physical force. Further, if the distance K is larger than the radius of the inner circumference of the magnet 210, the area of the yoke 330, on which the magnetic force of the magnet 210 acts, is reduced. Therefore, it is impossible to obtain a proper operating physical force. For these reasons, it is desirable that the distance K is substantially equal to the radius of the inner circumference of the magnet 210.

Figure 12A:
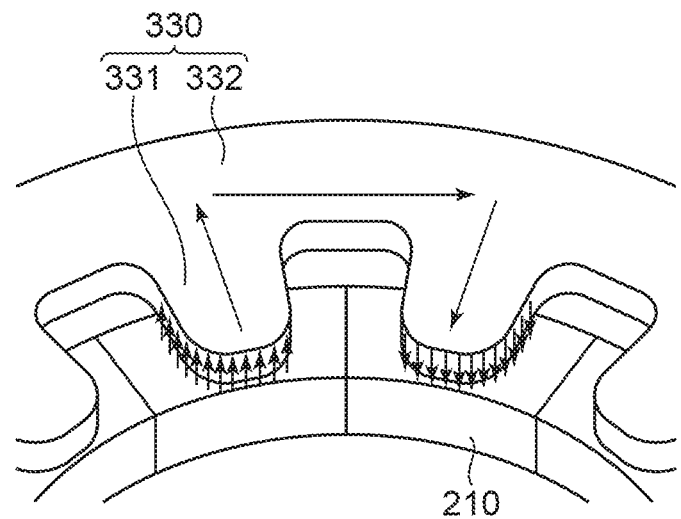
FIGS. 12A and 12B are views useful in explaining the influence of the magnet and the yoke appearing in FIGS. 10A to 10E, on the magnetic flux density in the tooth portions.
Figure 12B:
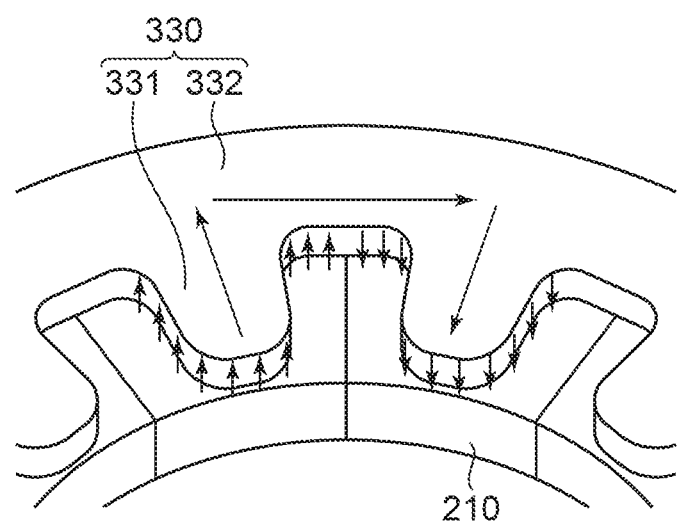

FIGS. 12A and 12B are views useful in explaining how the magnet 210 and the yoke 330, appearing in FIGS. 10A to 10E, have influence on the magnetic flux density in the tooth portions 331. FIG. 12A shows the magnetic flux density in the tooth portions 311 in a case where the diameter of the magnet outer circumference 730 is smaller than the diameter of the connection portion inner circumference r 740 of the yoke 330, and FIG. 12B shows the magnetic flux density in the tooth portions 331 in a case where the diameter of the magnet outer circumference 730 is larger than the diameter of the connection portion inner circumference 740 of the yoke 330.

Referring to FIG. 12A, in the illustrated example, since the diameter of the magnet outer circumference 730 is smaller than the diameter of the connection portion inner circumference 740 of the yoke 330, a space between the magnet 210 and the connection portion 322 is increased so that the magnetic resistance in this space is increased. This prevents the magnetic flux generated from the magnet 210 from directly flowing into the connection portion 332. Further, the magnetic flux flowing into the connection portion 332 via each tooth portion 331 is prevented from directly flowing from the connection portion 332 into the magnet 210.

As a result, the magnetic flux generated from the magnet 210 flows from each tooth portion 331 into adjacent ones of the tooth portions 331 via the connection portion 332 without being stagnated. Therefore, the strong magnetic force acts on the tooth portions 331, which increases the strength of the attracting force between the magnet 210 and the tooth portions 331, whereby it is possible to obtain a stronger and proper operating physical force.

Referring to FIG. 12B, since the diameter of the magnet outer circumference 730 is larger than the diameter of the connection portion inner circumference 740 of the yoke 330, the space between the magnet 210 and the connection portion 322 is reduced so that the magnetic resistance in this space is lowered. As a result, the magnetic flux generated from the magnet 210 directly flows into the connection portion 332. Further, the magnetic flux flowing into the connection portion 332 via each tooth portion 331 can flow from the connection portion 332 toward the magnet 210.

Therefore, the magnetic flux originally flowing from each tooth portion 331 to adjacent ones of the tooth portions 331 via the connection portion 332 flows toward the magnet 210 before reaching the tip end of the adjacent tooth portion 331. Therefore, the magnet flux density in the tooth portions 331 is lowered, which reduces the strength of the attracting force between the magnet 210 and the tooth portions 331, and hence it is impossible to obtain a proper operating physical force.

As described above, in the second embodiment of the present invention, it is also possible not only to reduce the size of the dial, but also to obtain a proper operating physical force when operating the dial.

Next, a description will be given of a digital camera as an electronic apparatus according to a third embodiment of the present invention. Note that the digital camera as the electronic apparatus according to the third embodiment has the same configuration as that of the camera shown in FIGS. 1A, 1B, and 2.

In the third embodiment, two yokes having the same shape are used in the dial 120 so as to obtain a proper operating physical force and suppress tilting of the dial 120.

Figure 13A:
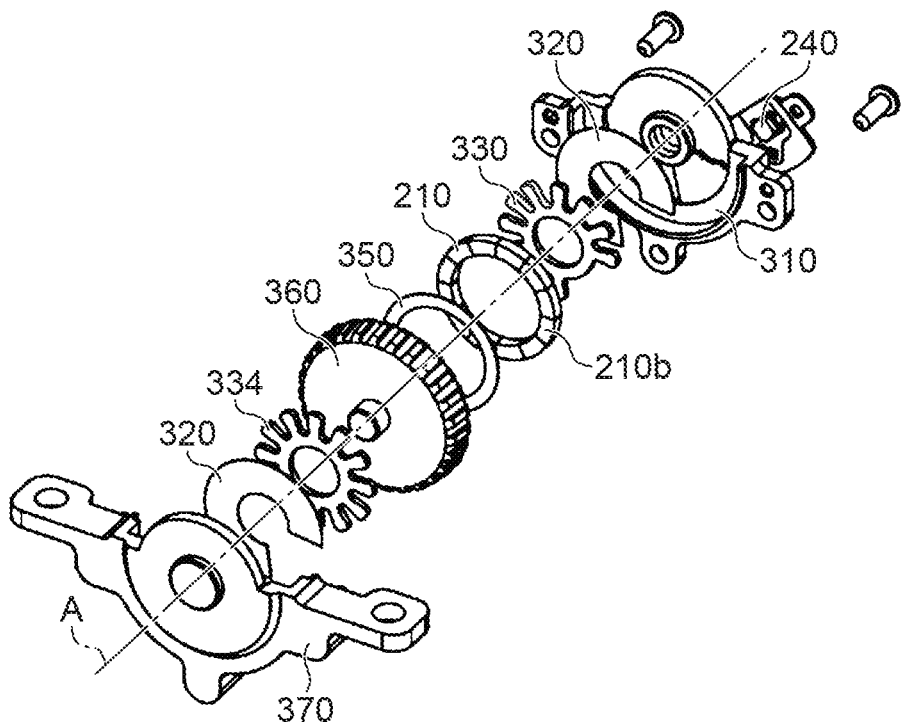
FIGS. 13A and 13B are views useful in explaining the construction of a dial used in a digital camera as an electronic apparatus according to a third embodiment of the present invention.
Figure 13B:
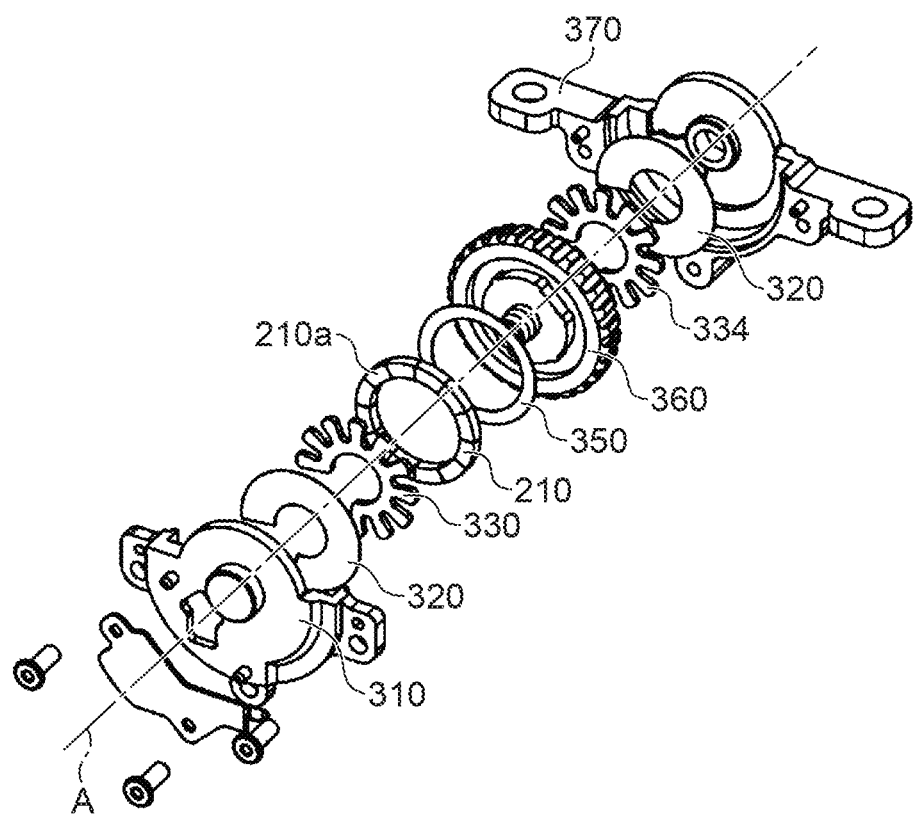

FIGS. 13A and 13B are views useful in explaining the construction of a dial used in the camera according to the third embodiment of the present invention. FIG. 13A is an exploded perspective view of the dial, as viewed from the front, and FIG. 13B is an exploded perspective view of the dial, as viewed from the rear. Note that in FIGS. 13A and 13B, the same component elements as those in FIGS. 3A and 3B are denoted by the same reference numerals.

As shown in FIGS. 13A and 13B, the dial 120 has the yoke (in the present embodiment, referred to as the first yoke) 330 and a second yoke 334. The first yoke 330 is disposed in an opposed relation to the first magnetized surface 210a and is fixed to the base member 310 by the yoke fixing member 320.

The second yoke 334 is a magnetic body having a plurality of tooth portions 331, which is disposed in an opposed relation to the second magnetized surface 210b via the fixing member 350 and the dial portion 360 and is fixed to the cover member 370 by the yoke fixing member 320.

As shown in FIGS. 13A and 13B, the magnet 210 is held in a state sandwiched between the first yoke 330 and the second yoke 334, and the tooth portions 331 of the first yoke 330 and the second yoke 334 are arranged such that they are directly opposed to the associated magnetic poles of the magnet 210, respectively, in a stationary state of the magnet 210. Further, the first yoke 330 and the second yoke 334 are arranged such that all of the tooth portions 331 of them are in a directly opposed relation to each other in the direction of the rotational axis A.

In the illustrated example, the operating physical force is generated by changes in an attracting force between the first yoke 330 and the magnet 210 and changes in an attracting force between the second yoke 334 and the magnet 210. Since the magnet 210 is interposed between the two yokes, it is possible to obtain a more proper operating physical force than in a case where one yoke is used. Note that in the illustrated example, an iron material having magnetism, such as an SPCC material, is used for each of the first yoke 330 and the second yoke 334.

FIGS. 14A to 14E are diagrams useful in explaining the operating physical force generated by the magnetic field of the magnet 210 and the first and second yokes 330 and 334. FIG. 14A shows a state in which the magnet 210 and the first and second yokes 330 and 334 magnetically attract each other and the tooth portions 331 of the first and second yokes are directly opposed to the poles of the magnetized portions, respectively. FIG. 14B shows the magnet 210 and the first and second yokes 330 and 334, as viewed from a direction indicated by an arrow C in FIG. 14A. FIG. 14C shows a state in which the magnet 210 has been rotated from the state shown in FIG. 14B in the CW direction before the tooth portions 331 of the first and second yokes 330 and 334 are opposed to the poles of the next magnetized portions.

Further, FIG. 14D shows a state in which the magnet 210 has been rotated from the state shown in FIG. 14C in the CW direction and the tooth portions 331 of the first and second yokes 340 and 334 start to be opposed to the next magnetic poles, and FIG. 14E shows a state in which the magnet 210 has been rotated from the state shown in FIG. 14D in the CW direction and the tooth portions 331 of the first and second yokes 340 and 334 are directly opposed to the poles of the next magnetized portions.

Note that in FIGS. 14A to 14E, the same component elements as those in FIGS. 5A to 5E are denoted by the same reference numerals.

The first yoke 330 and the second yoke 334 each include the plurality of tooth portions 331 and the connection portion 332 connecting the plurality of tooth portions 331. As described hereinabove, since the magnet 210 is rotated in unison with the dial portion 360, a series of movements shown in FIGS. 14B to 14E correspond to movement of one click of the dial portion 360. Assuming that FIG. 14B shows the state of a first stop point, FIG. 14E shows the state of a second stop point.

Referring to FIG. 14A, a magnet flux generated from the magnet 210 flows from each one of the tooth portions 331 of the first yoke 330 and the second yoke 334 into adjacent ones of the tooth portions 331 via the connection portion 332, whereby the magnetic field formed by each adjacent N pole and S pole is closed.

Referring to FIG. 14B, the magnet 210, and first yoke 330 and the second yoke 334 attract each other, and no force in the CW or CCW direction is applied to the magnet 210.

Referring to FIG. 14C, when the magnet 210 has been rotated from the state shown in FIG. 14B in the CW direction, the magnet 210, and the first yoke 330 and the second yoke 334 attract each other, so that the magnet 210 receives a force in the CCW direction. This force is a force in a direction opposite to the rotational direction, and hence the user feels a resistance to his/her handling operation.

Referring to FIG. 14D, when the magnet 210 has been rotated from the state shown in FIG. 14C in the CW direction and each tooth portion 331 of the first yoke 330 and the second yoke 334 starts to be opposed to the magnetic pole of the next magnetized portion, the magnet 210 receives a force in the CW direction due to magnetic attraction between the magnet 210, and the first yoke 330 and the second yoke 334. This force is a force in the same direction as the rotational direction, and the user feels a force drawing the dial portion 360 toward the second stop position as the user performs his/her handling operation.

A force generated by the magnet 210 and the first and second yokes 330 and 334 as they are shifted from the state shown in FIG. 14B while overcoming the resistance felt in the state shown in FIG. 14C to the state shown in FIG. 14E in which the second stop point is reached is the operating physical force.

Figure 15A:
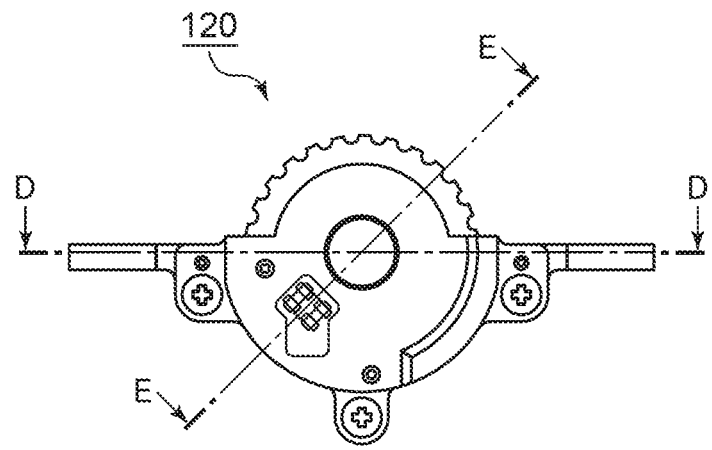
FIGS. 15A to 15C are views useful in explaining the dial shown in FIGS. 13A and 13B.
Figure 15B:
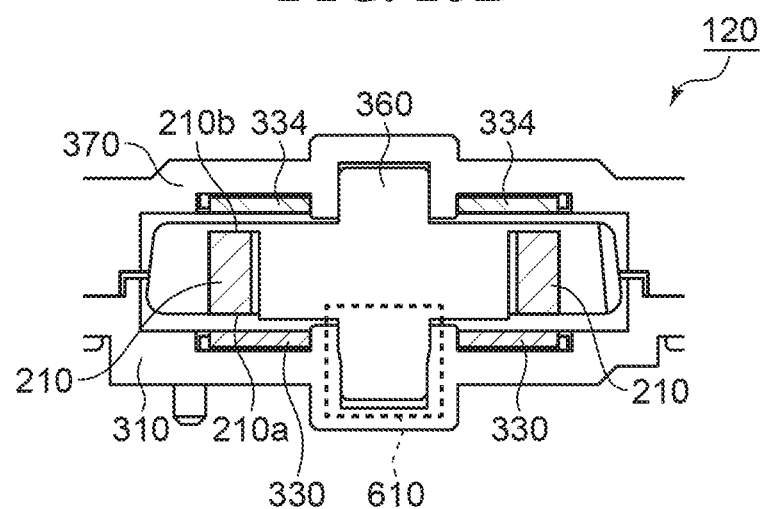
Figure 15C:
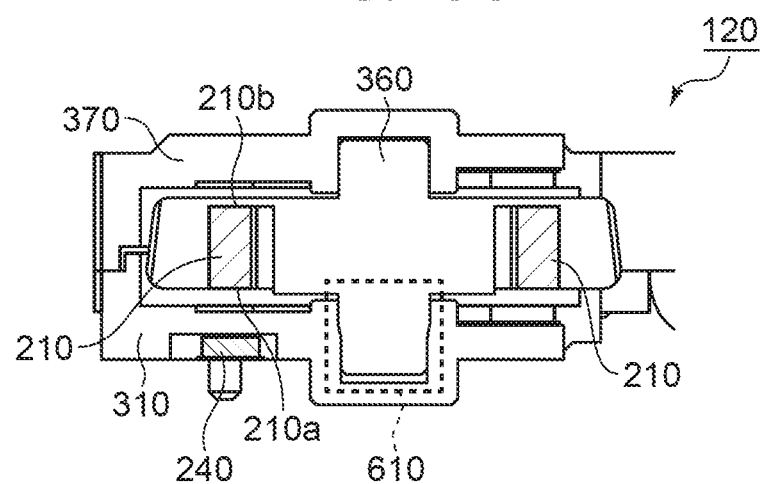

FIGS. 15A to 15C are views useful in explaining the dial 120 shown in FIGS. 13A and 13B. FIG. 15A is a view of the dial 120, as viewed in the direction of the rotational axis. FIG. 15B is a cross-sectional view taken along D-D in FIG. 15A. FIG. 15C is a cross-sectional view taken along E-E in FIG. 15A.

As shown in FIG. 15B, the first yoke 330 is disposed in an opposed relation to the first magnetized surface 210a of the magnet 210 with a predetermined gap between the magnet 210 and the first yoke 330. The second yoke 334 is disposed in an opposed relation to the second magnetized surface 210b of the magnet 210 with a predetermined gap between the magnet 210 and the second yoke 334. Further, the dial portion 360 is rotatably held in the slide fitting portion 610 formed in the base member 310.

As described with reference to FIG. 6C, the Hall IC 240 is disposed in a directly opposed relation to the first magnetized surface 210a of the magnet 210 with a predetermined gap between the magnet 210 and the Hall IC 204.

Note that the first yoke 330 is associated with the magnet 210 as described with reference to FIGS. 7A and 7B. Further, the first yoke 330 and the second yoke 334 have the same shape and the second yoke 334 is also associated with the magnet 210 as described with reference to FIGS. 7A and 7B.

How the relationship between the magnet 210 and the first yoke 330 and the relationship between the magnet 210 and the second yoke 334 have influence on the magnet flux density in the tooth portions 331 are the same as that described with reference to FIGS. 8A and 8B. More specifically, by making the diameter of the magnet inner circumference 710 larger than the diameter of the connection portion outer circumference 720 of the first yoke 330 and the second yoke 334, the strong magnetic force acts on the tooth portions 331. This increases the strength of the attracting force between the magnet 210 and the tooth portions 331, whereby it is possible to obtain a more proper operating physical force.

Further, the positional relationship between the magnet 210, the second yoke 334, and the Hall IC 240 is the same as the example described with reference to FIG. 9, and the Hall IC 240 is disposed in the space 910 where there are no tooth portions 331 in the second yoke 334.

Figure 16A:
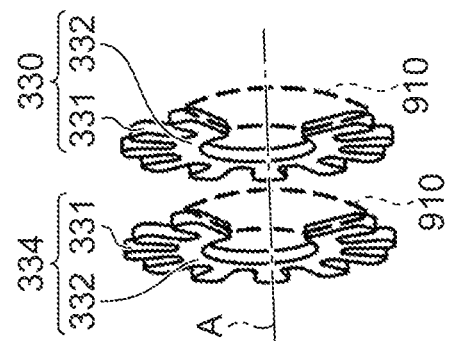
FIGS. 16A to 16F are views useful in explaining tilt suppression for the dial, using the magnet, a first yoke, and a second yoke, appearing in FIGS. 13A and 13B.
Figure 16B:
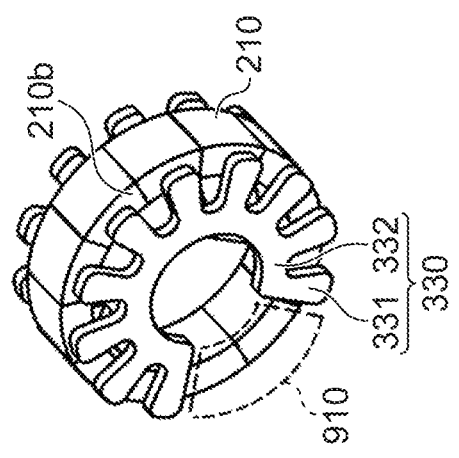

FIGS. 16A to 16F are views useful in explaining tilt suppression for the dial, using the magnet 210, the first yoke 330, and the second yoke 334. FIG. 16A is a perspective view of the magnet 210, the first yoke 330, and the second yoke 334, as viewed from the front, and FIG. 16B is a perspective view of the magnet 210, the first yoke 330, and the second yoke 334, as viewed from the rear.

Figure 16C:
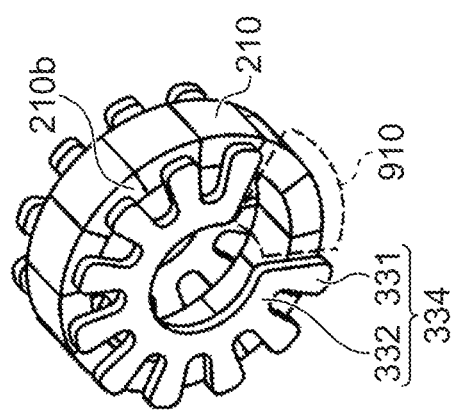
Figure 16D:
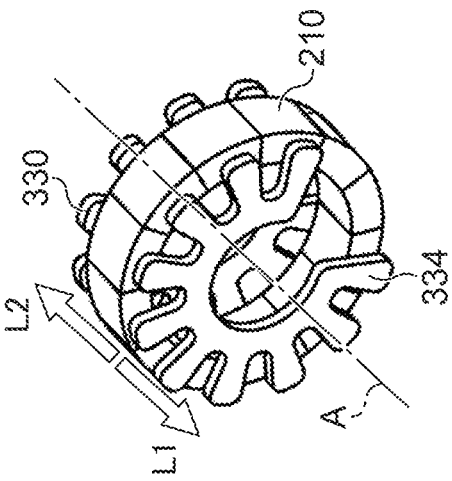
Figure 16E:
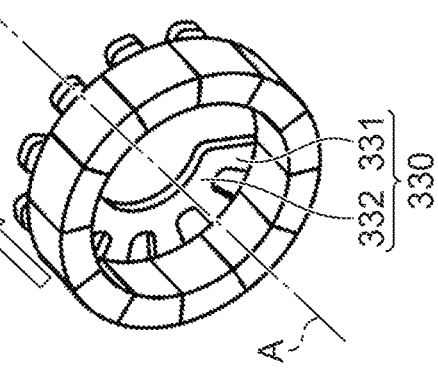
Figure 16F:
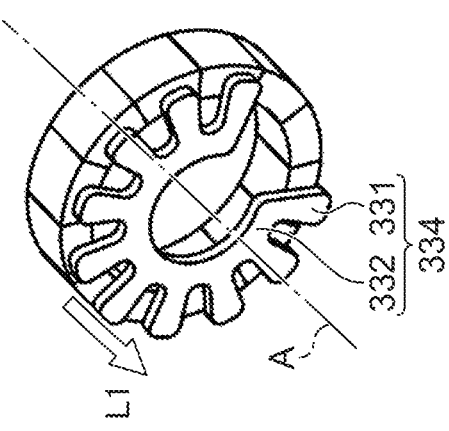

Further, FIG. 16C is a perspective view showing only the first yoke 330 and the second yoke 334, and FIG. 16D is a perspective view showing a relationship between the magnet 210 and the second yoke 334, as viewed from the front. Further, FIG. 16E is a perspective view showing a relationship between the magnet 210 and the first yoke 330, as viewed from the rear, and FIG. 16F is a perspective view showing a relationship between the magnet 210, the first yoke 330, and the second yoke 334, as viewed from the front.

Referring to FIG. 16A, the magnet 210 and the tooth portions 331 of the second yoke 334 magnetically attract each other. On the other hand, since the space 910 where there are no tooth portion 331 is defined in the second yoke 334, the magnet 210 and the second yoke 334 do not attract each other in the space 910.

Referring to FIG. 16B, the magnet 210 and the tooth portions 331 of the first yoke 330 magnetically attract each other. On the other hand, since the space 910 where there are no tooth portions 331 is defined in the first yoke 330, the magnet 210 and the first yoke 330 do not attract each other in the space 910.

Referring to FIG. 16C, all the tooth portions 331 of the first yoke 330 and the tooth portions 331 of the second yoke 334 are opposed to each other in the direction of the rotational axis A. Further, the space 910 of the first yoke 330 and the space 910 of the second yoke 334 are also opposed to each other in the direction of the rotational axis A.

The first yoke 330 is fixed to the base member 310 by the yoke fixing member 320, as described hereinabove with reference to FIGS. 13A and 13B. Further, the second yoke 334 is fixed to the cover member 370 by the yoke fixing member 320. Further, the magnet 210 is fixed to the dial portion 360 held rotatably about the rotational axis A.

Referring to FIG. 16D, when attention is paid only to attraction between the magnet 210 and the second yoke 334, the magnet 210 tilts about the rotational axis A in a direction indicated by an arrow L1 due to existence of the space 910.

Referring to FIG. 16E, when attention is paid only to attraction between the magnet 210 and the first yoke 330, the magnet 210 tilts about the rotational axis A in a direction indicated by an arrow L2 due to existence of the space 910.

Referring to FIG. 16F, the second yoke 334 having the same shape as the first yoke 330 is disposed on an opposite side to the first yoke 330 across the magnet 210. Therefore, the attracting forces indicated by the arrow L1 and the arrow L2 are balanced with each other, which suppresses tilting of the magnet 210.

Thus, in the third embodiment, it is possible not only to reduce the size of the dial and obtain a proper operating physical force when operating the dial, but also to suppress tilting of the dial since the magnet is held between the two yokes having the same shape.

Next, a description will be given of a digital camera as an electronic apparatus according to a fourth embodiment of the present invention. Note that the digital camera as the electronic apparatus according to the fourth embodiment has the same configuration as that of the camera shown in FIGS. 1A, 1B, and 2.

Figure 17A:
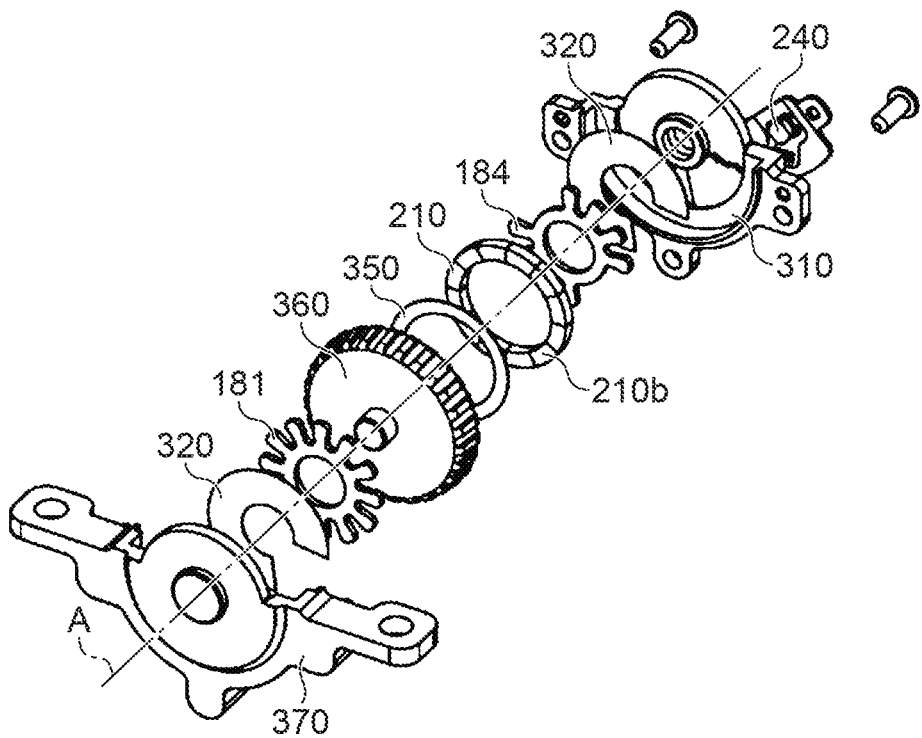
FIGS. 17A and 17B are views useful in explaining the construction of a dial used in a digital camera as an electronic apparatus according to a fourth embodiment of the present invention.
Figure 17B:
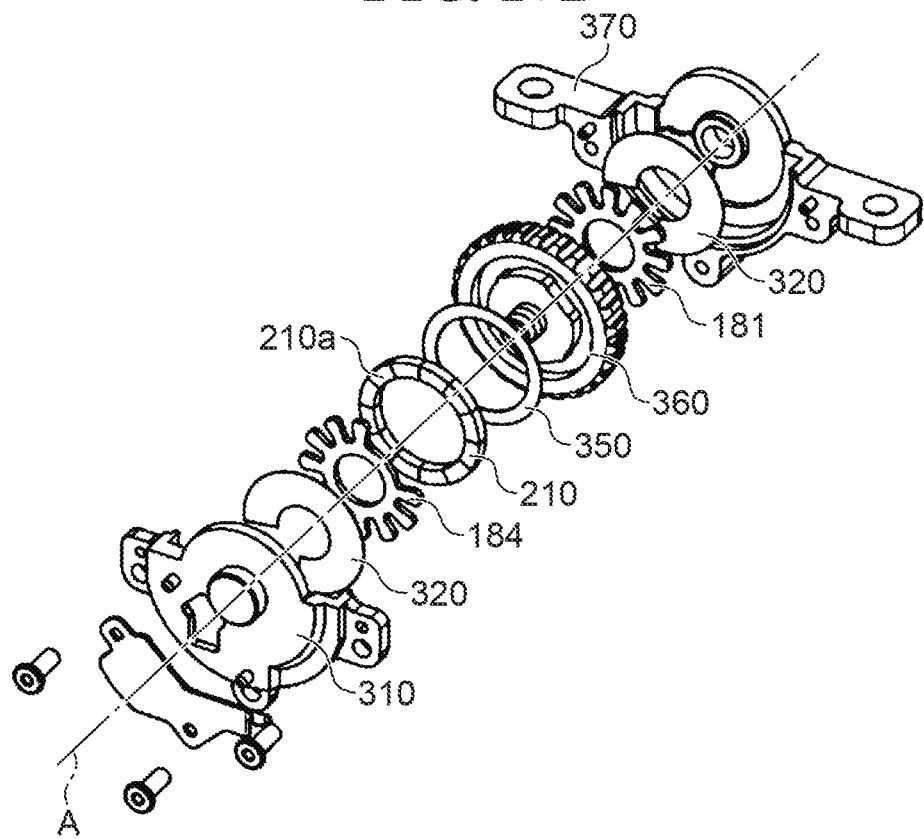

FIGS. 17A and 17B are views useful in explaining the construction of a dial used in the digital camera as the electronic apparatus according to the fourth embodiment of the present invention. FIG. 17A is an exploded perspective view of the dial, as viewed from the front, and FIG. 17B is an exploded perspective view of the dial, as viewed from the rear. Note that in FIGS. 17A and 17B, the same component elements as those in FIGS. 3A and 3B are denoted by the same reference numerals.

The illustrated dial 120 has a whole-circumference yoke 181 and a partial yoke 184. The whole-circumference yoke 181 is a magnetic body having a plurality of tooth portions 182 and is disposed in an opposed relation to the second magnetized surface 210b of the magnet 210. Further, the whole-circumference yoke 181 is fixed to the cover member 370 by the yoke fixing member 320.

The partial yoke 184 is a magnetic body having a plurality of tooth portions 185 and is disposed in an opposed relation to the first magnetized surface 210a of the magnet 210. Further, the partial yoke 184 is fixed to the base member 310 by the yoke fixing member 320.

The magnet 210 is held between the whole-circumference yoke 181 and the partial yoke 184 and the tooth portions 182 of the whole-circumference yoke 181 (see FIGS. 18A and 18B) and the tooth portions 185 of the partial yoke 184 (see FIGS. 18C and 18D) are directly opposed to the magnetic poles of the magnet 210, respectively, in a stationary state of the magnet 210. Further, all of the tooth portions 185 of the partial yoke 184 are directly opposed to the tooth portions 182 of the whole-circumference yoke 181 in the direction of the rotational axis A.

The operating physical force is generated by changes in the attracting force between the whole-circumference yoke 181 and the magnet 210 and changes in the attracting force between the partial yoke 184 and the magnet 210. Since the magnet 210 is held between the two yokes, it is possible to obtain a more proper operating physical force than in a case where one yoke is used.

Note that in the illustrated example, an iron material having magnetism, such as an SPCC material, is used for each of the whole-circumference yoke 181 and the partial yoke 184. Further, as described herein above, the cover member 370 is fixed to the base member 310, and the dial portion 360 is held rotatably about the rotational axis A between the base member 310 and the cover member 370.

Figure 18A:
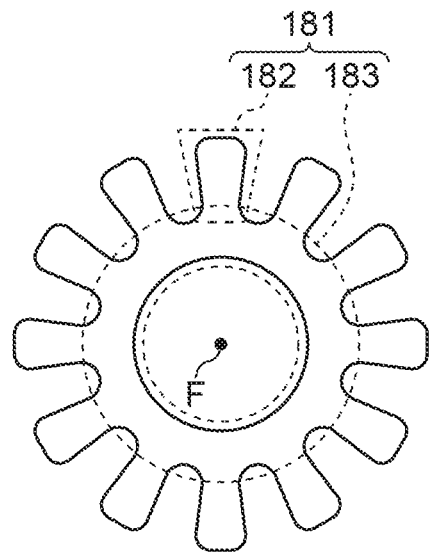
FIGS. 18A to 18D are views useful in explaining a relationship between a magnet, a whole-circumference yoke, and a partial yoke, appearing in FIGS. 17A and 17B.
Figure 18B:
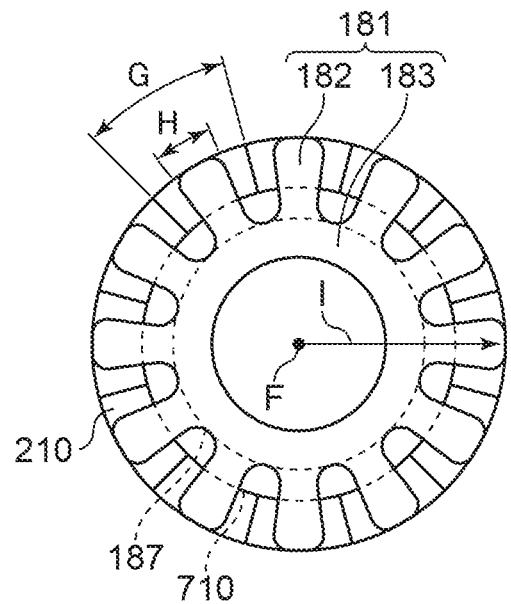
Figure 18C:
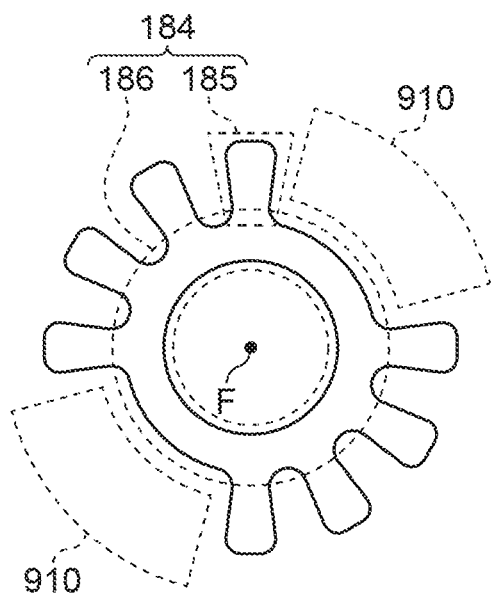
Figure 18D:
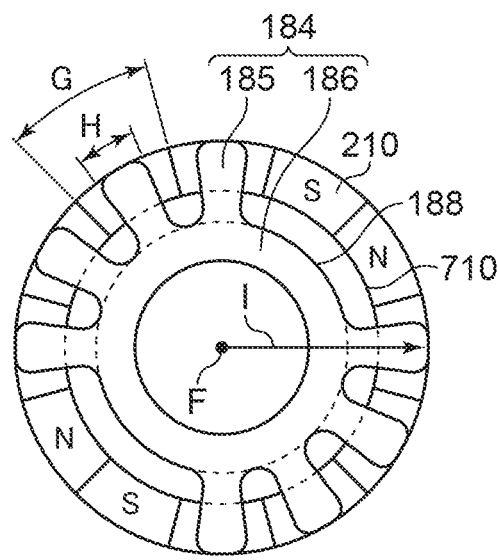

FIGS. 18A to 18D are views useful in explaining a relationship between the magnet 210, and the whole-circumference yoke 181 and the partial yoke 184, appearing in FIGS. 17A and 17B. FIG. 18A shows the whole-circumference yoke 181 in detail, FIG. 18B shows a relationship between the magnet 210 and the whole-circumference yoke 181, FIG. 18C shows the partial yoke 184 in detail, and FIG. 18D shows a relationship between the magnet 210 and the partial yoke 184.

Referring to FIG. 18A, the whole-circumference yoke 181 has the plurality of tooth portions 182 and a connection portion 183 connecting the tooth portions 182. The plurality of tooth portions 182 are rotationally symmetrically arranged such that they radially protrude outward, with a point F as the center of the radiation pattern. Further, the respective ends of the plurality of tooth portions 182, toward the center point F, are connected by the connection portion 183.

Referring to FIG. 18B, the tooth portions 182 of the whole-circumference yoke 181 are arranged at intervals of the same distance as the magnetization pitch G of the magnet 210. Therefore, when rotation is stopped, each of all of the tooth portions 182 is directly opposed to the N-pole or the S-pole of the magnet 210. The width H of each tooth portion 182 of the whole-circumference yoke 181 is the same as that described of the yoke 330 with reference to FIGS. 7A and 7B.

The diameter of the magnet inner circumference 710 is larger than the diameter of a connection portion outer circumference 187 of the whole-circumference yoke 181. Therefore, the magnetic flux generated from the magnet 210 flows into the tooth portions 181 closer to the magnet 210 and hardly flows into the connection portion 183.

A distance I from the center point F to the tip end of each tooth portion 182 of the whole-circumference yoke 181 is the same as that described of the yoke 330 with reference to FIGS. 7A and 7B.

Referring to FIG. 18C, the partial yoke 184 has the plurality of tooth portions 185 and a connection portion 186 connecting the tooth portions 185. The plurality of tooth portions 185 are rotationally symmetrically arranged such that they radially protrude outward, with the point F as the center of the radiation pattern. Further, the respective ends of the plurality of tooth portions 185, toward the center point F, are connected by the connection portion 186. Further, the two spaces 910 where there no tooth portion 185 are defined in the partial yoke 184 so as to enable the Hall IC 240 to detect a magnetic field and suppress tilting of the magnet 210.

Referring to FIG. 18D, the tooth portions 185 of the partial yoke 184 are arranged at intervals of the same distance as the magnetization pitch G of the magnet 210. Therefore, when rotation is stopped, each of the tooth portions 185 is directly opposed to the N-pole or the S-pole of the magnet 210. The width H of each tooth portion 185 of the partial yoke 184 is the same as that described of the yoke 330 with reference to FIGS. 7A and 7B.

The diameter of the magnet inner circumference 710 is larger than the diameter of a connection portion outer circumference 188 of the partial yoke 184. Therefore, the magnetic flux generated from the magnet 210 flows into the tooth portions 185 closer to the magnet 210 and hardly flows into the connection portion 186.

A distance I from the center point F to the tip end of each tooth portion 185 of the partial yoke 184, i.e. the radius of the outer circumference of the tooth portions 185 is the same as that described of the yoke 330 with reference to FIGS. 7A and 7B.

Figure 19A:
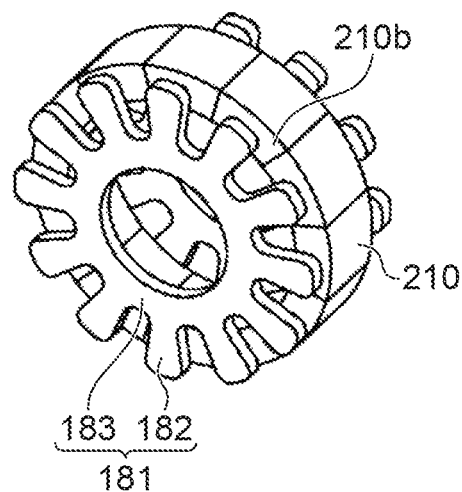
FIGS. 19A and 19B are views useful in explaining tilt suppression for the dial, using the magnet, the whole-circumference yoke, and the partial yoke, appearing in FIGS. 17A and 17B.
Figure 19B:
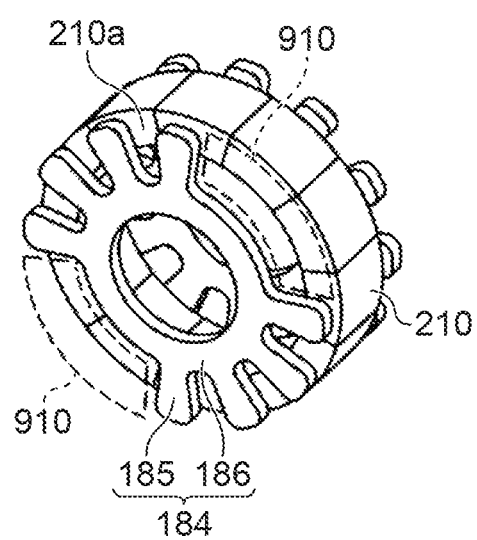

FIGS. 19A and 19B are views useful in explaining tilt suppression for the dial, using the magnet 210, the whole-circumference yoke 181, and the partial yoke 184, appearing in FIGS. 17A and 17B. FIG. 19A is a perspective view of the magnet 210, the whole-circumference yoke 181, and the partial yoke 184, as viewed from the front, and FIG. 19B is a perspective view of the magnet 210, the whole-circumference yoke 181, and the partial yoke 184, as viewed from the rear.

Referring to FIG. 19A, the magnet 210 and the whole-circumference yoke 181 magnetically attract each other. Since the tooth portions 182 of the whole-circumference yoke 181 are rotationally symmetrically arranged, the magnet 210 is prevented from tilting.

Referring to FIG. 19B, the magnet 210 and the partial yoke 184 magnetically attract each other. Since the two spaces 910 in which there are no tooth portion 185 are defined in the partial yoke 184, and the tooth portions 185 of the whole-circumference yoke 181 are rotationally symmetrically arranged, the magnet 210 is prevented from tilting.

As described above, in the fourth embodiment, the two spaces, opposite to each other, are defined in one yoke (partial yoke), whereby magnetic field detection and tilt suppression are performed. Further, by holding the magnet between the two yokes each having the rotationally symmetrical shape, it is possible to obtain a proper operating physical force.

Next, a description will be given of a digital camera as an electronic apparatus according to a fifth embodiment of the present invention. Note that the digital camera as the electronic apparatus according to the fifth embodiment has the same configuration as that of the camera shown in FIGS. 1A, 1B, and 2.

Figure 20A:
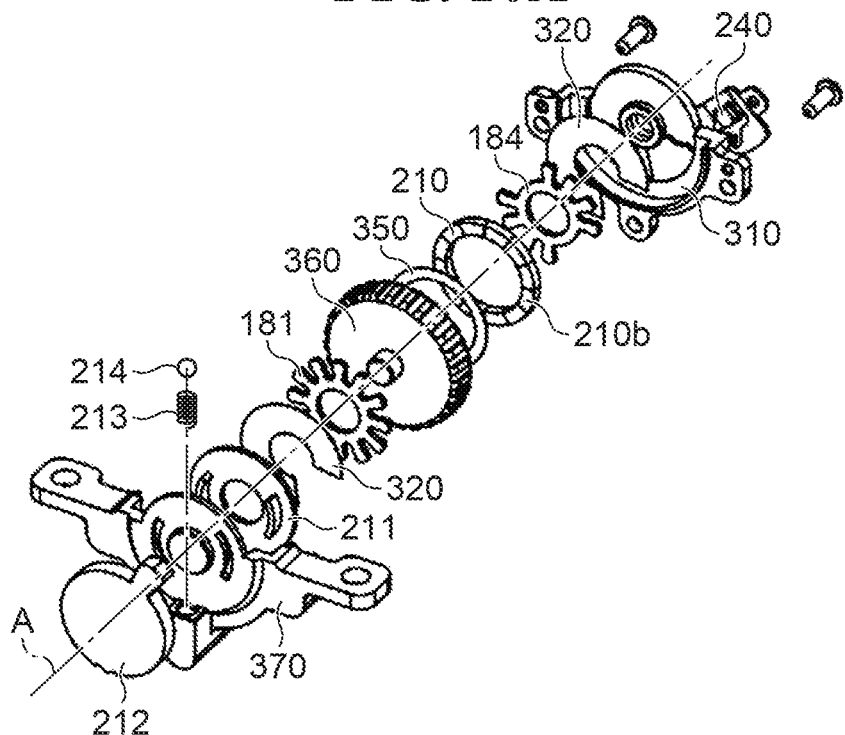
FIGS. 20A and 20B are views useful in explaining the construction of a dial used in a digital camera as an electronic apparatus according to a fifth embodiment of the present invention.
Figure 20B:
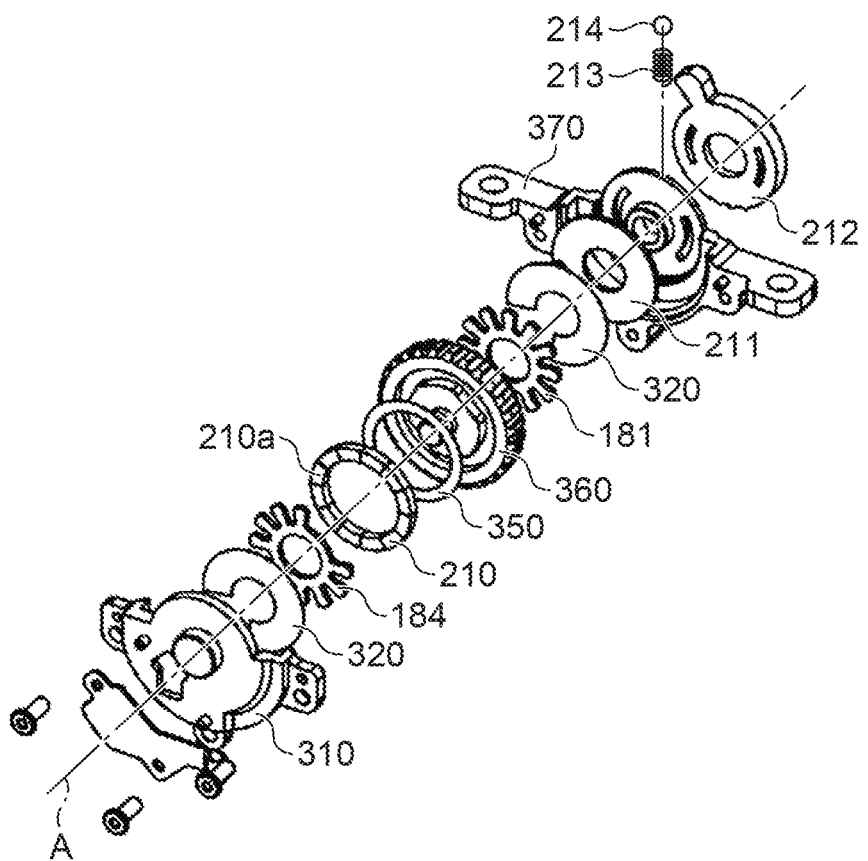

FIGS. 20A and 20B are views useful in explaining the construction of a dial used in the digital camera as the electronic apparatus according to the fifth embodiment of the present invention. FIG. 20A is an exploded perspective view of the dial, as viewed from the front, and FIG. 20B is an exploded perspective view of the dial, as viewed from the rear. Note that in FIGS. 20A and 20B, the same component elements as those in FIGS. 3A and 3B are denoted by the same reference numerals.

The whole-circumference yoke 181 is disposed in an opposed relation to the second magnetized surface 210b of the magnet 210 as described hereinabove, and is fixed to a fixing plate 211 by the yoke fixing member 320. The fixing plate 211 is fixed to a lever member 212 with the cover member 370 interposed therebetween, and rotates about the rotational axis A in unison with the lever member 212.

The lever member 212 is rotatable about the rotational axis A, and by operating the lever member 212, the whole-circumference yoke 181 is rotated as described hereinafter. An operating physical force is generated by a click spring 213 and a click ball 214 when the lever member 212 is rotated, as described hereinafter.

As described hereinabove, the partial yoke 184 is disposed in an opposed relation to the first magnetized surface 210a of the magnet 210 and is fixed to the base member 310 by the yoke fixing member 320. The magnet 210 is held between the whole-circumference yoke 181 and the partial yoke 184.

Figure 21B:
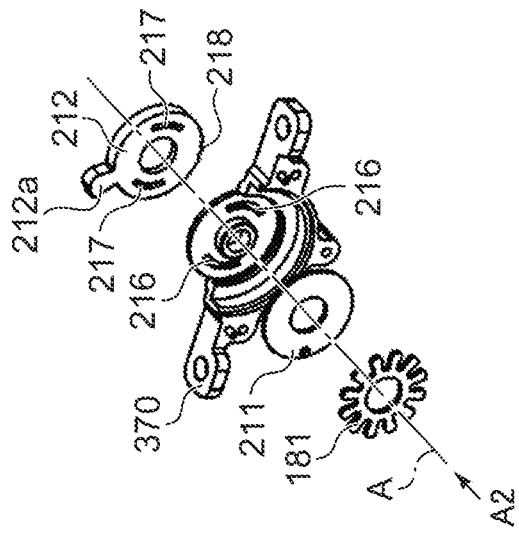
FIGS. 21A to 21E are views useful in explaining the operation of a lever member appearing in FIGS. 20A and 20B.
Figure 21A:
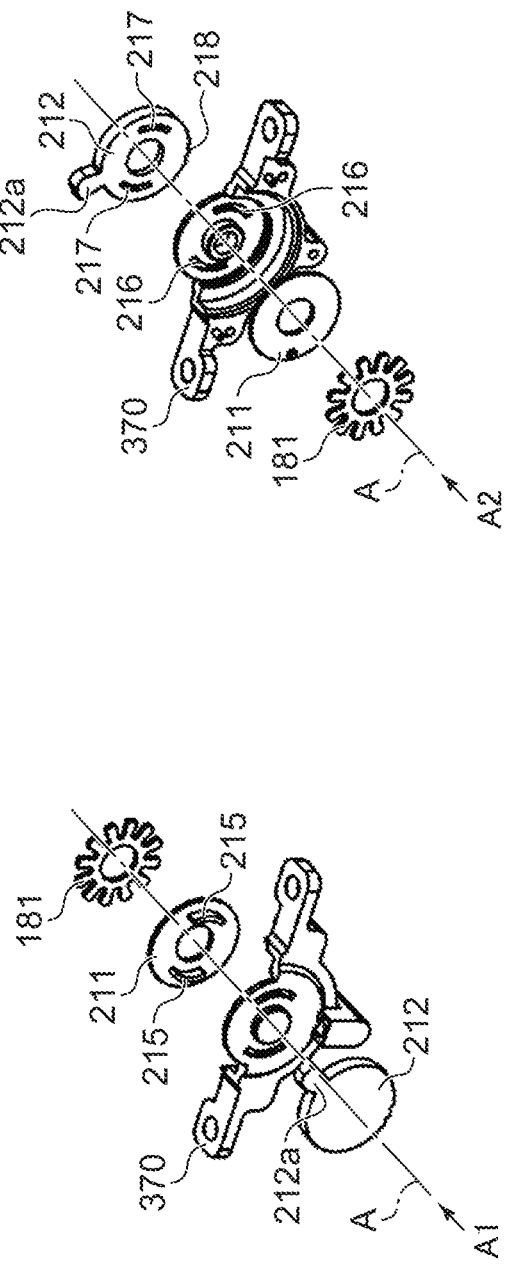
Figure 21E:
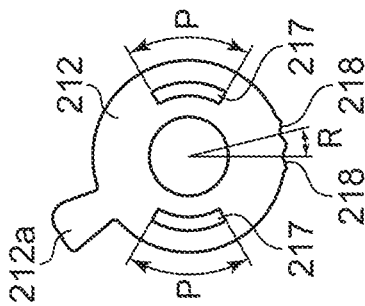
Figure 21D:
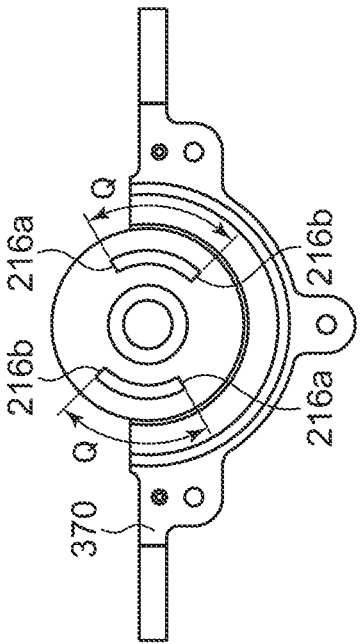
Figure 21C:
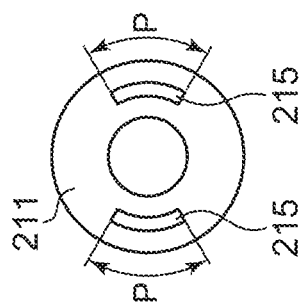

FIGS. 21A to 21E are views useful in explaining the operation of the lever member 212, appearing in FIGS. 20A and 20B. FIG. 21A is an exploded perspective view of the lever member 212 and associated members therearound, as viewed from the front. FIG. 21B is an exploded perspective view of the lever member 212 and the associated members therearound, as viewed from the rear. FIG. 21C shows the fixing plate 211, as viewed from the front (front surface). FIG. 21D shows the cover member 370, as viewed from the rear, and FIG. 21E shows the lever member 212, as viewed from the rear.

Note that in the illustrated example, a side viewed from a direction indicated by an arrow A1 is defined as the front, and a side viewed from a direction indicated by an arrow A2 is defined as the rear.

As shown in FIGS. 21A and 21B, the fixing plate 211 has two protruding portions 215 and the cover member 370 has two holes 216. The lever member 212 has two groove portions 217 and click grooves 218 (see FIG. 21E). A lever operating portion 212a formed on the lever member 212 protrudes from the exterior of the camera, and when a user rotates the lever operating portion 212a about the rotational axis A, the lever member 212 is switched to a first state or a second state, as described hereinafter.

The protruding portions 215 formed on the fixing plate 211 are fixed in the groove portions 217 of the lever member 212 through the holes 216 formed in the cover member 370. When fixing the protruding portions 215 in the groove portions 217, glue (not shown) is used.

The whole-circumference yoke 181 is fixed to the fixing plate 211 by the yoke fixing member 320 (not shown in FIGS. 21A to 21E). The lever member 212, the fixing plate 211, and the whole-circumference yoke 181 are stopped by the click grooves 218, the click spring 213, and the click ball 214, in the first state and the second state.

As shown in FIGS. 21C to 21E, the width of each protruding portion 215 is indicated by P, and the width of each hole 216 is indicated by Q. Further, the width of each groove portion 217 is indicated by P, and an interval between the click grooves 218 is indicated by R. The width Q of each hole 216 is larger than the width P of each protruding portion 215 by the interval R of the click grooves 218. Further, the interval R of the click grooves 218 has a length corresponding to half of the magnetization pitch G of the magnet 210.

Therefore, when operating the lever member 212, the fixing plate 211 is rotated about the rotational axis A through an angle corresponding to the half of the magnetization pitch G of the magnet 210 in unison with the lever member 212. That is, the whole-circumference yoke 181 fixed to the fixing plate 211 is rotated about the rotational axis A through the angle corresponding to the half of the magnetization pitch G.

In the first state, each protruding portion 215 is brought into contact with a first end 216a of an associated one of the holes 216. On the other hand, in the second state, each protruding portion 215 is in contact with a second end 216b of the associated one of the holes 216.

Figure 22A:
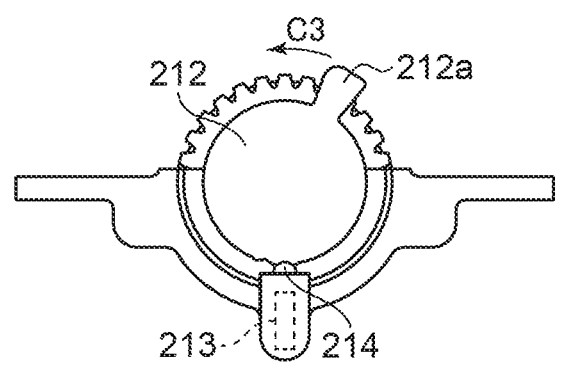
FIGS. 22A to 22E are views useful in explaining a first state and a second state of the lever member appearing in FIGS. 21A to 21E.
Figure 22B:
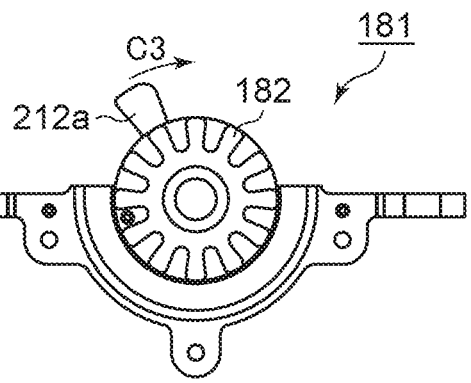
Figure 22C:
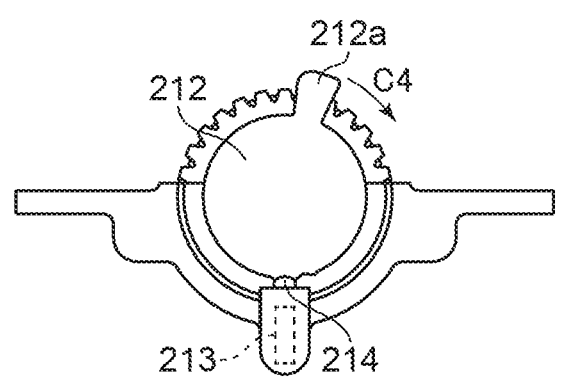
Figure 22D:
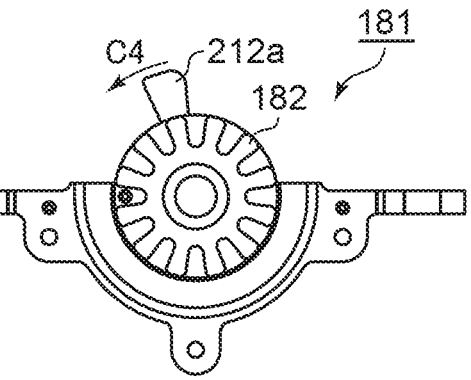
Figure 22E:
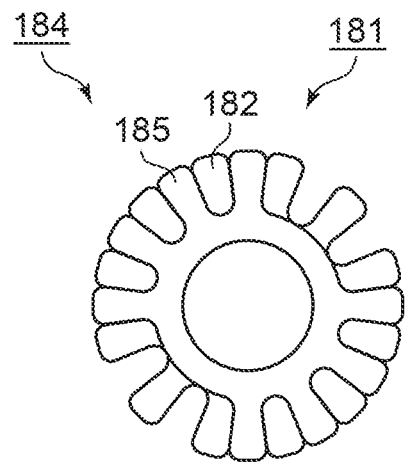

FIGS. 22A to 22E are views useful in explaining the first state and the second state of the lever member 212, appearing in FIGS. 21A to 21E. FIG. 22A shows the lever member 212 in the first state, as viewed from the front, and FIG. 22B shows the state of the whole-circumference yoke 181 in the first state, as viewed from the rear. FIG. 22C shows the lever member 212 in the second state, as viewed from the front, and FIG. 22D shows the state of the whole-circumference yoke 181 in the second state, as viewed from the rear. FIG. 22E shows the whole-circumference yoke 181 and the partial yoke 184 in the second state, as viewed from the rear.

Referring to FIG. 22A, the lever member 212 is stopped in the first state by the click spring 213 and the click ball 214. Further, as shown in FIG. 22B, in the first state, the tooth portions 182 of the whole-circumference yoke 181 and the tooth portions 185 of the partial yoke 184 are directly opposed to each other in the direction of the rotational axis A (the tooth portions 185 are hidden behind the tooth portions 182). Therefore, in the state in which the magnet 210 is stopped, the tooth portions 182 and the tooth portions 185 are directly opposed to the magnetic poles of the magnet 210, respectively.

In FIGS. 22A and 22B, by operating the lever operating portion 212*a* in a direction indicated by an arrow C3, the lever member 212 is shifted from the first state to the second state.

Referring to FIG. 22C, the lever member 212 is stopped in the second state by the click spring 213 and the click ball 214. Further, as shown in FIG. 22D, in the second state, the whole-circumference yoke 181 is in a position rotated about the rotational axis A from the first state through an angle corresponding to the half of the magnetization pitch G.

Therefore, as shown in FIG. 22E, in the second state, the tooth portions 182 of the whole-circumference yoke 181 and the tooth portions 185 of the partial yoke 184 are not opposed to each other in the direction of the rotational axis A. In FIGS. 22C and 22D, by operating the lever operating portion 212*a* in a direction indicated by an arrow C4, the lever member 212 is shifted from the second state to the first state.

Figure 23A:
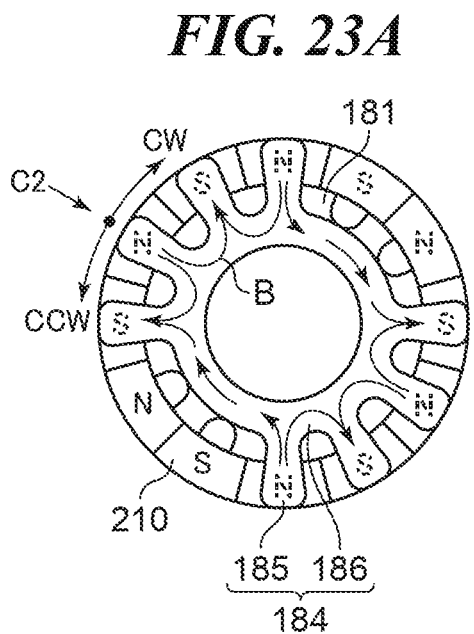
FIGS. 23A to 23E are views useful in explaining an operating physical force generated by the magnetic field of a magnet and the whole-circumference yoke and the partial yoke, in a case where the lever member appearing in FIGS. 21A to 21E is in the second state.
Figure 23B:
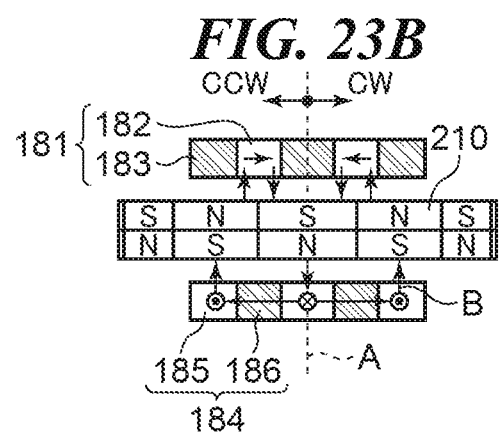

FIGS. 23A to 23E are views useful in explaining the operating physical force generated by the magnetic field of the magnet 210, and the whole-circumference yoke 181 and the partial yoke 184, in a case where the lever member 212 appearing in FIGS. 21A to 21E is in the second state. FIG. 23A shows a relationship between the tooth portions 185 and 182 of the partial yoke 184 and the whole-circumference yoke 181, and the magnetic poles, in the second state, and FIG. 23B shows the magnet 210, the whole-circumference yoke 181, and the partial yoke 184, in a state as viewed from a direction indicted by an arrow C2 in FIG. 23A.

Figure 23C:
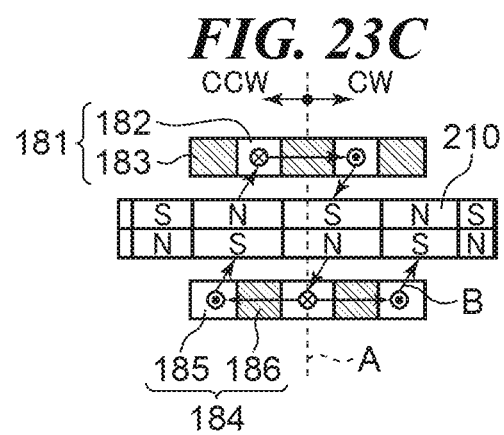
Figure 23D:
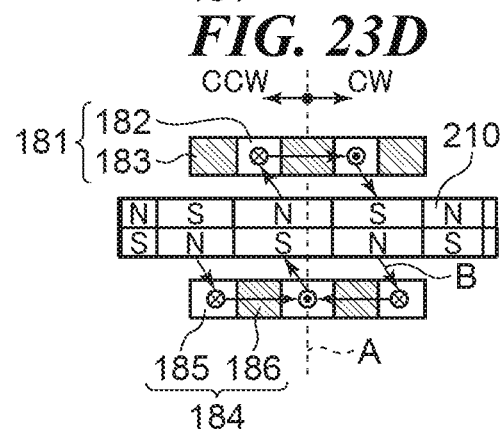
Figure 23E:
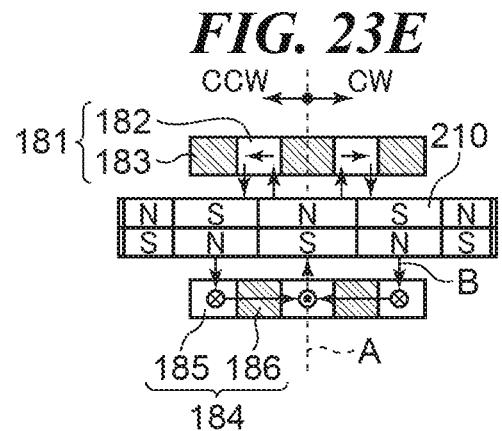

Further, FIG. 23C shows a state in which the magnet 210 has been rotated from the state shown in FIG. 23B in the CW direction before each tooth portion 185 of the partial yoke 184 is opposed to the magnetic pole of the next magnetized portion. FIG. 23D shows a state in which the magnet 210 has been rotated from the state shown in FIG. 23C in the CW direction and each tooth portion 185 of the partial yoke 184 starts to be opposed to the magnetic pole of the next magnetized portion. FIG. 23E shows a state in which the magnet 210 has been rotated from the state shown in FIG. 23D in the CW direction and each tooth portion 185 of the partial yoke 184 is opposed to the next magnetic pole and each tooth portion 182 of the whole-circumference yoke 181 is opposed to the center between the magnetic poles.

Referring to FIG. 23A, a magnetic flux generated from the magnet 210 flows through each tooth portion 182 of the whole-circumference yoke 181, whereby the magnetic field formed by each adjacent N pole and S pole is closed. At this time, the magnetic flux hardly flows into the connection portion 183 of the whole-circumference yoke 181.

On the other hand, in the partial yoke 184, the magnetic flux flows from each tooth portion 185 into adjacent ones of the tooth portions 185 through the connection portion 186, whereby the magnetic field formed by each adjacent N pole and S pole is closed. Therefore, in FIG. 23B, no force in the CW or CCW direction is applied to the magnet 210.

Referring to FIG. 23C, the attracting force between the magnet 210 and the tooth portions 182 of the whole-circumference yoke 181 and the attracting force between the magnet 210 and the tooth portions 185 of the partial yoke 184 are offset by each other in the rotational direction. Therefore, a force in the CW or CCW direction is hardly applied to the magnet 210.

Referring to FIG. 23D, the attracting force between the magnet 210 and the tooth portions 182 of the whole-circumference yoke 181 and the attracting force between the magnet 210 and the tooth portions 185 of the partial yoke 184 are offset by each other in the rotational direction. Therefore, a force in the CW or CCW direction is hardly applied to the magnet 210.

Referring to FIG. 23E, a magnetic flux generated from the magnet 210 flows through each tooth portion 182 on the whole-circumference yoke 181, whereby the magnetic field formed by each adjacent N-pole and S-pole is closed. At this time, the magnetic flux hardly flows into the connection portion 183 of the whole-circumference yoke 181.

On the other hand, in the partial yoke 184, the magnetic flux flows from each tooth portion 185 into the adjacent tooth portions 185 through the connection portion 186, whereby the magnetic field formed by the adjacent N-pole and S-pole is closed. Therefore, no force in the CW or CCW direction is applied to the magnet 210.

In a series of movements in the second state, shown in FIGS. 23B to 23E, the user hardly feels the operating physical force in the rotational operation. In the first state, as described hereinabove with reference to FIGS. 14A to 14E, the operating physical force of the dial portion 360 is generated, and hence the user can reduce the operating physical force by switching the dial to the second state.

The whole-circumference yoke 181 and the partial yoke 184 each have the rotationally symmetrical shape, as described hereinabove with reference to FIGS. 18A to 18D. Therefore, tilt suppression for the dial portion 360, using the magnet 210, and the whole-circumference yoke 181 and the partial yoke 184, is the same as the example described with reference to FIGS. 19A and 19B.

As described above, in the fifth embodiment of the present invention, the rotation mechanism is provided using the magnet and the two yokes each having the rotationally symmetrical shape, for rotating one of the yokes through a predetermined angle, and hence it is possible to make the operating physical force variable while suppressing tilting of the dial.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-219471 filed Nov. 22, 2018, which is hereby incorporated by reference herein in its entirety.

What is claimed is:

1. A rotation operation device including a rotation operation member capable of rotating about a predetermined axis, comprising:
   a magnet that is ring-shaped and is magnetized in a magnetization direction parallel to the predetermined axis such that a plurality of magnetic poles alternate, the magnet being configured to rotate about the predetermined axis along with rotation of the rotation operation member;
   a first magnetic body having first tooth portions formed at predetermined intervals along a circumferential direction such that the first tooth portions extend in radial directions of the magnet; and
   a rotation detection section configured to detect rotation of the magnet,
   wherein the magnet overlaps with the first tooth portions in a direction of the predetermined axis, wherein an operating physical force is generated according to changes in positions of the magnetic poles and the first tooth portions, which are caused by rotation of the magnet, wherein the first magnetic body has a first connection portion connecting the first tooth portions, wherein an inner diameter of the magnet is larger than an outer diameter of the first connection portion, wherein a space where there are no first tooth portions is defined in the first magnetic body, wherein the rotation detection section is disposed in the space defined in the first magnetic body, wherein the first magnetic body and the rotation detection section are disposed on a same surface side of the magnet, wherein the magnet has a first magnetized surface and a second magnetized surface which are opposite to each other and are perpendicular to the magnetization direction, and wherein the first magnetic body and the rotation detection section are disposed in an opposed relation to the first magnetized surface, the rotation operation device further comprising a magnetic member disposed in an opposed relation to the second magnetized surface.

2. The rotation operation device according to claim 1, wherein the magnetic member is ring-shaped, and
wherein an outer diameter and an inner diameter of the magnetic member are substantially equal to the outer diameter and the inner diameter of the magnet.

3. The rotation operation device according to claim 1, wherein the rotation detection section includes a Hall element that detects a change in the magnetic field caused by rotation of the magnet.

4. An electronic apparatus comprising:
the rotation operation device according to claim 1; and
a control unit configured to perform processing determined in advance according to rotation of the magnet, which is detected by the rotation detection section.

5. The electronic apparatus according to claim 4, wherein at least part of the rotation operation member is exposed from an exterior of the electronic apparatus.

6. The electronic apparatus according to claim 4, wherein the electronic apparatus is an image capture apparatus that acquires an image by performing image capture of an object, and
wherein the rotation operation device is used at least when setting image capture conditions of the image capture apparatus.

7. A rotation operation device including a rotation operation member capable of rotating about a predetermined axis, comprising:
a magnet that is ring-shaped and is magnetized in a magnetization direction parallel to the predetermined axis such that a plurality of magnetic poles alternate, the magnet being configured to rotate about the predetermined axis along with rotation of the rotation operation member;
a first magnetic body having first tooth portions formed at predetermined intervals along a circumferential direction such that the first tooth portions extend in radial directions of the magnet; and
a rotation detection section configured to detect rotation of the magnet,
wherein the magnet overlaps with the first tooth portions in a direction of the predetermined axis, wherein an operating physical force is generated according to changes in positions of the magnetic poles and the first tooth portions, which are caused by rotation of the magnet, wherein the rotation operation device further comprises a second magnetic body having second tooth portions formed at predetermined intervals along a circumferential direction such that the second tooth portions extend in radial directions of the magnet, wherein the first magnetic body and the second magnetic body are arranged such that the first magnetic body and the second magnetic body sandwich the magnet, wherein the magnet overlaps with the first tooth portions and the second tooth portions in the direction of the predetermined axis, and wherein the operating physical force is generated according to changes in positions of the magnetic poles, and the first tooth portions and the second tooth portions, which are caused by rotation of the magnet.

8. The rotation operation device according to claim 7, wherein the first magnetic body and the second magnetic body have a first connection portion and a second connection portion connecting the first tooth portions and the second tooth portions, respectively, and
wherein an inner diameter of the magnet is larger than outer diameters of the first connection portion and the second connection portion.

9. The rotation operation device according to claim 7, wherein the first magnetic body and the second magnetic body have a first connection portion and a second connection portion connecting the first tooth portions and the second tooth portions, respectively, and
wherein an outer diameter of the magnet is smaller than inner diameters of the first connection portion and the second connection portion.

10. The rotation operation device according to claim 9, wherein a space where there are no first tooth portions or no second tooth portions is defined in the first magnetic body or the second magnetic body, and
wherein the rotation detection section is disposed in the space defined in the first magnetic body or the second magnetic body.

11. The rotation operation device according to claim 10, wherein the magnet has a first magnetized surface and a second magnetized surface which are opposite to each other and are perpendicular to the magnetization direction, and
wherein the first magnetic body and the rotation detection section are disposed in an opposed relation to the first magnetized surface, and
wherein the second magnetic body is disposed in an opposed relation to the second magnetized surface.

12. The rotation operation device according to claim 7, wherein the first magnetic body and the second magnetic body have the same shape.

13. The rotation operation device according to claim 7, wherein the first magnetic body and the second magnetic body have a rotationally symmetrical shape.

14. The rotation operation device according to claim 7, further comprising a rotation member that causes at least one of the first magnetic body and the second magnetic body to rotate about the predetermined axis to thereby shift the at least one of the first magnetic body and the second magnetic body to a first state and a second state different from the first state.

15. The rotation operation device according to claim 14, wherein the first state is a state in which when one of each first tooth portion and each second tooth portion is directly opposed to one of the magnetic poles of the magnet, the other of each first tooth portion and each second tooth portion is also directly opposed to one of the magnetic poles of the magnet, and wherein the second state is a state in which when one of each first tooth portion and each second tooth portion is directly opposed to one of the magnetic poles of the magnet, the other of each first tooth portion and each second tooth portion is not directly opposed to one of the magnetic poles of the magnet.

* * * * *